US011920067B2

(12) United States Patent
Chastek et al.

(10) Patent No.: US 11,920,067 B2
(45) Date of Patent: Mar. 5, 2024

(54) ADHESIVE COMPOSITIONS AND ARTICLES

(71) Applicant: 3M INNOVATIVE PROPERTIES COMPANY, St. Paul, MN (US)

(72) Inventors: Thomas Q. Chastek, St. Paul, MN (US); Robert D. Waid, Maplewood, MN (US); Shujun J. Wang, Woodbury, MN (US); Ross J. DeVolder, Woodbury, MN (US); Doreen Eckhardt, Dormagen (DE)

(73) Assignee: 3M Innovative Properties Company, St. Paul, MN (US)

( * ) Notice: Subject to any disclaimer, the term of this patent is extended or adjusted under 35 U.S.C. 154(b) by 555 days.

(21) Appl. No.: 16/469,737

(22) PCT Filed: Dec. 12, 2017

(86) PCT No.: PCT/IB2017/057845
§ 371 (c)(1),
(2) Date: Jun. 14, 2019

(87) PCT Pub. No.: WO2018/116067
PCT Pub. Date: Jun. 28, 2018

(65) Prior Publication Data
US 2019/0322904 A1 Oct. 24, 2019

Related U.S. Application Data

(60) Provisional application No. 62/436,001, filed on Dec. 19, 2016.

(51) Int. Cl.
*C09J 7/26* (2018.01)
*C08L 35/00* (2006.01)
*C09J 7/38* (2018.01)
*C09J 11/08* (2006.01)

(52) U.S. Cl.
CPC ............... *C09J 7/387* (2018.01); *C08L 35/00* (2013.01); *C09J 7/26* (2018.01); *C09J 11/08* (2013.01); *C09J 2301/408* (2020.08); *C09J 2301/414* (2020.08); *C09J 2400/243* (2013.01); *C09J 2409/00* (2013.01); *C09J 2423/00* (2013.01); *C09J 2453/00* (2013.01); *C09J 2461/00* (2013.01); *Y10T 428/2809* (2015.01); *Y10T 428/2883* (2015.01)

(58) Field of Classification Search
None
See application file for complete search history.

(56) References Cited

U.S. PATENT DOCUMENTS

| 4,107,233 A * | 8/1978 | Hansen ................. C09J 153/02 525/93 |
| 5,296,547 A | 3/1994 | Nestegard |
| 5,393,787 A | 2/1995 | Nestegard |
| 5,605,964 A | 2/1997 | Groves |
| 5,637,646 A | 6/1997 | Ellis |
| 5,677,376 A * | 10/1997 | Groves ................... C08J 5/124 525/73 |
| 5,804,610 A | 9/1998 | Hamer |
| 5,986,011 A | 11/1999 | Ellis |
| 6,103,152 A | 8/2000 | Gehlsen |
| 6,294,249 B1 | 9/2001 | Hamer |
| 6,503,621 B1 | 1/2003 | Ma |
| 6,630,531 B1 | 10/2003 | Khandpur |
| 6,632,522 B1 | 10/2003 | Hyde |
| 6,783,850 B2 | 8/2004 | Takizawa |
| 6,939,911 B2 | 9/2005 | Tosaki |
| 8,445,597 B2 | 5/2013 | Tomita |
| 2007/0077418 A1 | 4/2007 | Sakurai |
| 2008/0281047 A1 | 11/2008 | Kishioka |
| 2010/0075132 A1* | 3/2010 | Waid ................... C09J 153/02 428/317.3 |
| 2010/0323197 A1 | 12/2010 | Maeda |
| 2014/0335299 A1 | 11/2014 | Wang |
| 2014/0377535 A1 | 12/2014 | Waid |
| 2015/0044457 A1* | 2/2015 | Chen ................... C09J 133/10 428/355 AC |

FOREIGN PATENT DOCUMENTS

| EP | 0372756 | 6/1990 |
| EP | 2226369 | 9/2010 |
| WO | WO 2008-070386 | 6/2008 |

(Continued)

OTHER PUBLICATIONS

"Specialty Monomers", Technical Data, BASF, 12 pgs.
"Stearyl Acrylate 18 (SA 18)", Petrochemical Specialty Monomers, Technical Information, BASF, Mar. 2012, 2 pgs.
"Thermal Transitions of Homopolymers: Glass Transition & Melting Point (continued)", Reference: Polymer Properties, Polymer Products from Aldrich [online], [retrieved from the internet on Aug. 8, 2019], URL<https://www3.nd.edu/~hgao/thermal_transitions_of_homopolymers.pdf>, pp. 52-53.

(Continued)

*Primary Examiner* — Anish P Desai
(74) *Attorney, Agent, or Firm* — Carlos M. Téllez Rodríguez; 3M Innovative Properties Co

(57) ABSTRACT

Pressure-sensitive adhesive compositions and articles that include a layer of the pressure-sensitive adhesive compositions are provided. The pressure-sensitive adhesive compositions are particularly well suited for use with substrates that have been considered to have difficult to bond to surfaces such as those routinely encountered in the automotive industry. For example, the pressure-sensitive adhesive can be adhered to clear coat compositions, painted surfaces, and various polymeric materials having low energy surfaces (e.g., surfaces having a surface energy no greater than 35 dynes per centimeter).

15 Claims, 1 Drawing Sheet

(56) References Cited

FOREIGN PATENT DOCUMENTS

| WO | WO 2013-074446 | 5/2013 |
| WO | WO 2014-186169 | 11/2014 |
| WO | WO 2015-143649 | 10/2015 |

OTHER PUBLICATIONS

Andrews, "Glass Transition Temperatures of Polymers", Wiley Online Library, 1999, 27 Pages.
Eaves, Handbook of Polymer Foams, 1-4 (2004).
International Search Report for PCT International Application No. PCT/IB-2017/057845, dated Jun. 18, 2018, 4pgs.

* cited by examiner

ADHESIVE COMPOSITIONS AND ARTICLES

CROSS REFERENCE TO RELATED APPLICATIONS

This application is a national stage filing under 35 U.S.C 371 of PCT/IB2017/057845 filed Dec. 12, 2017, which claims the benefit of US Provisional Patent Application No. 62/436,001, filed Dec. 19, 2016, the disclosures of which are incorporated by reference in their entirety herein.

FIELD

The present invention is related to adhesive compositions, in particular pressure sensitive adhesive compositions, and articles comprising such adhesives.

BACKGROUND

Various adhesive compositions have been developed to bond two substrates together to form a bonded article. While many adhesive compositions are known, the availability of new substrates that need to be bonded together as well as new end use requirements continue to drive a need for new adhesive compositions and new adhesive articles. In addition to performance needs, factors such as environmental regulations and processing costs can influence formulation requirements. For example, there is trend towards minimizing the amount of organic solvents used to produce adhesive compositions and articles containing adhesive compositions and to adhere to challenging surfaces such as those having low surface energy.

SUMMARY

Pressure-sensitive adhesive compositions and articles that include a layer of the pressure-sensitive adhesive compositions are provided. The pressure-sensitive adhesive compositions are particularly well suited for use with substrates that have been considered to have difficult to bond to surfaces such as those routinely encountered in the automotive industry. For example, the pressure-sensitive adhesive can be adhered to clear coat compositions, painted surfaces, and various polymeric materials having low energy surfaces (e.g., surfaces having a surface energy no greater than 35 dynes per centimeter). In many embodiments, the pressure-sensitive adhesives can be bonded to these surfaces without the need for an intervening primer layer.

In one aspect, a pressure-sensitive adhesive composition is provided that includes (a) a styrenic component that contains a first styrenic block copolymer having at least one rubbery block and at least two glassy blocks, (b) a first tackifier that is a linear (meth)acrylic-based polymeric material having a glass transition temperature equal to at least 50° C. and having a weight average molecular weight in a range of 5,000 to 200,000 Daltons, and (c) a second tackifier that is compatible with the rubbery block of the styrenic block copolymer, the second tackifier being an aliphatic hydrocarbon tackifier, a terpene resin, a terpene phenolic resin, or a mixture thereof.

In a second aspect, an article is provided that includes a first substrate and a first pressure-sensitive adhesive layer adjacent to the first substrate. The pressure-sensitive adhesive layer contains the pressure-sensitive adhesive composition described above.

In a third aspect, a method of making a pressure-sensitive adhesive composition is provided. The method includes providing each of the following components: (a) a styrenic component that contains a first styrenic block copolymer having at least one rubbery block and at least two glassy blocks, (b) a first tackifier that is a linear (meth)acrylic-based polymeric material having a glass transition temperature equal to at least 50° C. and having a weight average molecular weight in a range of 5,000 to 200,000 Daltons, and (c) a second tackifier that is compatible with the rubbery block of the styrenic block copolymer, the second tackifier being an aliphatic hydrocarbon tackifier, a terpene resin, a terpene phenolic resin, or a mixture thereof. The method further includes forming a blend of the components.

In a fourth aspect, a method of making an article is provided. The method includes providing a first substrate and a pressure-sensitive adhesive composition. Providing the pressure-sensitive adhesive composition includes blending the following components: (a) a styrenic component that contains a first styrenic block copolymer having at least one rubbery block and at least two glassy blocks, (b) a first tackifier that is a linear (meth)acrylic-based polymeric material having a glass transition temperature equal to at least 50° C. and having a weight average molecular weight in a range of 5,000 to 200,000 Daltons, and (c) a second tackifier that is compatible with the rubbery block of the styrenic block copolymer, the second tackifier being an aliphatic hydrocarbon tackifier, a terpene resin, a terpene phenolic resin, or a mixture thereof. The method further includes positioning a pressure-sensitive adhesive layer adjacent to a first major surface of the first substrate, wherein the pressure-sensitive adhesive layer comprise the pressure-adhesive composition.

DETAILED DESCRIPTION

Figure 1:
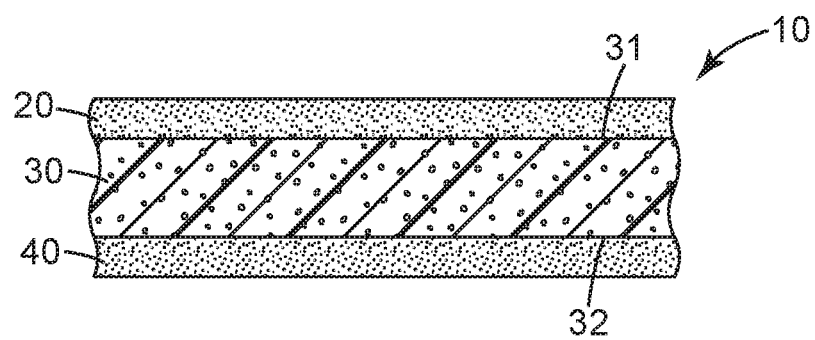
FIG. 1 illustrates a double sided adhesive tape having a backing (core) layer and a pressure-sensitive adhesive layer positioned adjacent to each major surface of the backing (core) layer.

Pressure-sensitive adhesive compositions, articles that contain the pressure-sensitive adhesive compositions, methods of making pressure-sensitive adhesive compositions, and method of making the articles are provided. The pressure-sensitive adhesive compositions include a blend of a styrenic component and two tackifiers with the first tackifier being a (meth)acrylic-based polymeric material and the second tackifier being an aliphatic hydrocarbon tackifier, a terpene resin, a terpene phenolic resin, or a mixture thereof. That is, two different types of tackifiers, one being a (meth)acrylic-based polymeric material and one not being a (meth)acrylic-based material are included in the pressure-sensitive adhesive compositions.

As used herein, the term "a" or "an" is equivalent to the expression "at least one".

As used herein, the term "and/or" with reference to two versions A and B means only A, only B, or both A and B.

As used herein, the term "polymer" or similar words such as "polymeric" refers to a polymeric material formed from one or more monomers. The polymer can be homopolymer, copolymer, terpolymer, and the like. The term "copolymer" means that there are at least two monomers used to form the polymer.

As used herein, the term "styrenic" refers to components, and/or copolymers, and/or glassy blocks that are derived from styrene or another mono-vinyl aromatic monomer similar to styrene.

Styrenic Component

The styrenic component includes at least one first styrenic block copolymer having at least one rubbery block and two or more glassy blocks. The first styrenic block copolymer is often a linear block copolymer of general formula $(G-R)_m$-G where G is a glassy block, R is a rubbery block, and m is an integer equal to at least 1. Variable m can be, for example, in a range of 1 to 10, in a range of 1 to 5, in a range of 1 to 3, or equal to 1. In many embodiments, the linear block copolymer is a triblock copolymer of formula G-R-G where the variable m in the formula $(G-R)_m$-G is equal to 1. Alternatively, the first styrenic block copolymer can be a radial (i.e., multi-arm) block copolymer of general formula $(G-R)_n$—Y where each R and G are the same as defined above, n is an integer equal to at least 3, and Y is the residue of a multifunctional coupling agent used in the formation of the radial block copolymer. The variable n represents the number of arms in the radial block copolymer and can be at least 4, at least 5, or at least 6 and often can be up to 10 or higher, up to 8, or up to 6. For example, the variable n is in a range of 3 to 10, in a range of 3 to 8, or in a range of 3 to 6.

In both the linear block copolymer and radial block copolymer versions of the first styrenic block copolymer, the glassy blocks G can have the same or different molecular weight. Similarly, if there is more than one rubbery block R, the rubbery blocks can have the same or different molecular weights.

Generally, each rubbery block has a glass transition temperature (Tg) that is less than room temperature. For example, the glass transition temperature is often less than 20° C., less than 0° C., less than −10° C., or less than −20° C. In some examples, the glass transition temperature is less than −40° C. or even less than −60° C. The glass transition temperature is commonly determined using methods such as Differential Scanning Calorimetry or Dynamic Mechanical Analysis.

Each rubbery block R in the linear or radial block copolymers is typically the polymerized product of a first polymerized conjugated diene, a hydrogenated derivative of a polymerized conjugated diene, or a combination thereof. The conjugated diene often contains 4 to 12 carbon atoms. Example conjugated dienes include, but are not limited to, butadiene, isoprene, 2-ethylbutadiene, 1-phenylbutadiene, 1,3-pentadiene, 1,3-hexadiene, 2,3-dimethyl-1,3-butadiene, and 3-ethyl-1,3-hexadiene.

Each rubbery block R can be a homopolymer or copolymer. The rubbery block R is often poly(butadiene), poly(isoprene), poly(2-ethylbutadiene), poly(1-phenylbutadiene), poly(1,3-pentadiene), poly(1,3-hexadiene), poly(2,3-dimethyl-1,3-butadiene), poly(3-ethyl-1,3-hexadiene), poly(ethylene/propylene), poly(ethylene/butylene), poly(isoprene/butadiene), or the like. In many embodiments, the block R is polybutadiene, polyisoprene, poly(isoprene/butadiene), poly(ethylene/butylene), or poly(ethylene/propylene).

The glass transition temperature of each glassy block G is generally at least 50° C., at least 60° C., at least 70° C., at least 80° C., at least 90° C., or even at least 100° C.

Each glassy block G in the linear or radial block copolymers is typically the polymerized product of a first mono-vinyl aromatic monomer. The mono-vinyl aromatic monomer usually contains, for example, at least 8 carbon atoms, at least 10 carbon atoms, or at least 12 carbon atoms and up to 18 carbon atoms, up to 16 carbon atoms, or up to 14 carbon atoms. Example first mono-vinyl aromatic monomers include, but are not limited to, styrene, vinyl toluene, alpha-methyl styrene, 2,4-dimethyl styrene, ethyl styrene, 2,4-diethyl styrene, 3,5-diethyl styrene, alpha-2-methyl styrene, 4-tert-butyl styrene, 4-isopropyl styrene, and the like.

Each glassy block G can be a homopolymer or a copolymer. The glassy block G is often poly(styrene), poly(vinyl toluene), poly(alpha-methyl styrene), poly(2,4-dimethyl styrene), poly(ethyl styrene), poly(2,4-diethyl styrene), poly(3,5-diethyl styrene), poly(alpha-2-methyl styrene), poly(4-tert-butyl styrene), poly(4-isopropyl styrene), copolymers thereof, and the like.

In many embodiments, each glassy block G is polystyrene homopolymer or is a copolymer derived from a mixture of styrene and a styrene-compatible monomer, which is a monomer that is miscible with styrene. In most cases where the glassy phase is a copolymer, at least 50 weight percent of the monomeric units are derived from styrene. For example, at least 60 weight percent, at least 70 weight percent, at least 80 weight percent, at least 90 weight percent, at least 95 weight percent, at least 98 weight percent, or at least 99 weight percent of the monomeric units in the glassy block G is derived from styrene.

The first styrenic block copolymer typically contains at least 5 weight percent and can contain up to 50 weight percent glassy blocks G. If the amount of glassy blocks G is too low, the cohesive strength may be too low because there is not sufficient physical crosslinking. On the other hand, if the amount of glassy blocks G is too high, the modulus may be too high (the composition may be too stiff and/or too elastic) and the resulting composition will not wet out well (spread on a surface such as on a substrate surface). For example, the first styrenic copolymer often contains at least 6 weight percent, at least 7 weight percent, at least 8 weight percent, at least 9 weight percent, or at least 10 weight percent and up to 45 weight percent, up to 40 weight percent, up to 35 weight percent, up to 30 weight percent, up to 25 weight percent, up to 20 weight percent, or up to 15 weight percent glassy blocks G. In some examples, the first styrenic block copolymer contains 5 to 50 weight percent, 5 to 40 weight percent, 5 to 30 weight percent, 5 to 20 weight percent, 5 to 15 weight percent, 10 to 50 weight percent, 10 to 40 weight percent, 10 to 35 weight percent, 10 to 30 weight percent, or 10 to 20 weight percent of the glassy blocks. The weight percent values are based on the total weight of the first styrenic block copolymer. The remainder of the weight of the first styrenic block copolymer is mainly attributable to the rubbery blocks.

In some embodiments, the first styrenic block compound is a linear triblock copolymer and the triblock copolymer typically contains at least 10 weight percent glassy blocks G. For example, the triblock copolymer contains at least 15 weight percent or at least 20 weight percent glassy blocks. The amount of the glassy blocks in the triblock copolymer can be up to 35 weight percent. For example, the triblock copolymer can contain up to 30 weight percent or up to 25 weight percent glassy blocks G. In some examples, the triblock copolymer contains 10 to 35 weight percent, 10 to 30 weight percent, 10 to 25 weight percent, or 10 to 20 weight percent of the glassy blocks. The weight percent values are based on the total weight of the triblock copolymer. The remainder of the weight of the linear triblock copolymer is attributable to the rubbery block. For example, the linear triblock copolymer can contain 10 to 35 weight percent glassy blocks and 65 to 90 weight percent rubbery block, 10 to 30 weight percent glassy block and 70 to 90 weight percent rubbery block, 10 to 25 weight percent glassy block and 75 to 90 weight percent rubbery block, or 10 to 20 weight percent of the glassy blocks and 80 to 90 weight percent rubbery blocks based on a total weight of the linear triblock copolymer.

In addition to the glassy blocks G and the rubbery blocks R, first styrenic block copolymers that are radial block copolymers include a multifunctional coupling agent J. The coupling agent often has multiple carbon-carbon double bonds, carbon-carbon triple bonds, or other groups that can react with carbanions of the living polymer used to form the radial block copolymers. The multifunctional coupling agents can be aliphatic, aromatic, heterocyclic, or a combination thereof. Example include, but are not limited to, polyvinyl acetylene, diacetylene, di(meth)acrylates (e.g., ethylene dimethacrylate), divinyl benzene, divinyl pyridine, and divinyl thiophene. Other examples include, but are not limited to, multi-functional silyl halide (e.g., tetrafunctional silyl halide), polyepoxides, polyisocyanates, polyketones, polyanhydrides, polyalkenyls, and dicarboxylic acid esters.

The weight average molecular weight of the first styrenic block copolymer is often no greater than 1,200,000 Daltons (Da). If the weight average molecular weight is too high, the copolymer will be difficult to use in preparation of a pressure-sensitive adhesive composition. That is, high concentrations of organic solvent would be needed for solution coating. Alternatively, if melt processed, the copolymer would be difficult to extrude due to its high melt viscosity and would be difficult to blend with other materials. The weight average molecular weight is often no greater than 1,000,000 Da, no greater than 900,000 Da, no greater than 800,000 Da, no greater than 600,000 Da, or no greater than 500,000 Da. The weight average molecular weight of the first styrenic block copolymer is typically at least 75,000 Da. If the weight average molecular weight is too low, the cohesive strength of the resulting pressure-sensitive adhesive may be unacceptably low. The weight average molecular weight is often at least 100,000 Da, at least 200,000 Da, at least 300,000 Da, or at least 400,000 Da. For example, the styrenic block copolymer can be in the range of 75,000 to 1,200,000 Da, in a range of 100,000 to 1,000,000 Da, in a range of 100,000 to 900,000 Da, or in a range of 100,000 to 500,000 Da. Radial block copolymers often have a higher weight average molecular weight than linear triblock copolymers. For example, in some embodiments, the radial block copolymers have a weight average molecular weight in a range of 500,000 to 1,200,000, in a range of 500,000 to 1,000,000 Da or in a range of 500,000 to 900,000 Da while the linear triblock copolymers have a weight average molecular weight in a range of 75,000 to 500,000 Da, in a range of 75,000 to 300,000 Da, in a range of 100,000 to 500,000 Da, or in a range of 100,000 to 300,000 Da.

Some first styrenic block copolymers are polymodal block copolymers. As used herein, the term "polymodal" means that the two or more glassy blocks do not all have the same weight average molecular weight. The polymodal block copolymers are usually "asymmetric", which means that the arms are not all identical. Such block copolymers can be characterized as having at least one "high" molecular weight glassy block and at least one "low" molecular weight glassy block, wherein the terms high and low are relative to each other. In some embodiments, the ratio of the number average molecular weight of the high molecular weight glassy block $(Mn)_H$, relative to the number average molecular weight of the low molecular weight glassy block $(Mn)_L$ is at least 1.25.

Methods of making asymmetrical, polymodal styrenic block copolymers are described, for example, in U.S. Pat. No. 5,296,547 (Nestegard et al.).

Some particular first styrenic block copolymers have glassy blocks that are polystyrene and one or more rubbery blocks selected from polyisoprene, polybutadiene, poly(isoprene/butadiene), poly(ethylene/butylene), and poly(ethylene/propylene). Some even more particular first styrenic block copolymers have glassy blocks that are polystyrene and one or more rubbery blocks selected from polyisoprene and polybutadiene.

The first styrenic block copolymers create physical crosslinks within the pressure-sensitive adhesive and contribute to the overall elastomeric character of the pressure-sensitive adhesive. Typically, higher glassy block levels enhance the amount of physical crosslinking that occurs. More physical crosslinking tends to increase the shear strength of the pressure-sensitive adhesive.

In addition to the first styrenic block copolymer, the styrenic component can further include a second styrenic block copolymer that is a diblock copolymer. This second styrenic copolymer can be separately added to the first styrenic block copolymer; however, many commercially available linear styrenic block copolymers (e.g., triblock copolymers) that can be used as the first styrenic copolymer include some styrenic diblock copolymer. The diblock copolymer has a single glassy block G and a single rubbery block R. The diblock copolymer (G-R) can lower the viscosity of the pressure-sensitive adhesive and/or provide functionality that is typically obtained by addition of a plasticizer. Like a plasticizer, the diblock copolymer can increase the tackiness and low temperature performance of the resulting pressure-sensitive adhesive composition. The diblock copolymer also can be used to adjust the flow of the pressure-sensitive adhesive. The amount of diblock needs to be selected to provide the desired flow characteristics without adversely affecting the cohesive strength of the pressure-sensitive adhesive.

The same types of glassy blocks G and rubbery blocks R described for use in the first styrenic block copolymer (e.g., triblock and radial block copolymer) can be used for the second styrenic block copolymer (i.e., the diblock copolymer). Often, however, it can be advantageous to not select the same rubbery block for both the first styrenic block copolymer and the second styrenic block copolymer to facilitate the solubility of other components such as the (meth)acrylic-based polymeric tackifier in the overall pressure-sensitive adhesive composition. Further, some rubbery blocks such as polybutadiene may preferably be used if the pressure-sensitive adhesive is subjected to radiation crosslinking.

The amount of glassy block G in the diblock copolymer is often at least 10 weight percent based on a weight of the diblock copolymer. In some embodiments, the diblock contains at least 15 weight percent, at least 20 weight percent, or at least 25 weight percent glassy block. The amount of glassy block can be up to 50 weight percent, up 45 weight percent, up to 40 weight percent, up to 35 weight percent, or up to 30 weight percent. For example, the diblock can contain 10 to 50 weight percent, 10 to 40 weight percent, 15 to 50 weight percent, 15 to 40 weight percent, 20 to 50 weight percent or 20 to 40 weight percent glassy block. The weight percent value are based on the total weight of the diblock copolymer. The remainder of the weight of the diblock copolymer is mainly attributable to the rubbery block.

The weight average molecular weight of the diblock copolymer can be up to 250,000 Da, up to 225,000 Da, up to 200,000 Da, or up to 175,000 Da. If the molecular weight is too high, the diblock copolymer may not function to provide the desired flow characteristics or to provide other desired characteristics such as, for example, reducing the elastic modulus and/or increasing the tackiness of the resulting pressure-sensitive adhesive composition. The weight average molecular weight is often at least 75,000 Da, at least 100,000 Da, at least 125,000 Da, or at least 150,000 Da. For example, weight average molecular weight of the diblock copolymer can be in a range of 75,000 to 250,000 Da, in a range of 100,000 to 250,000 Da, in a range of 125,000 to 250,000 Da, or in a range of 125,000 to 200,000 Da.

The styrenic component often contains 0 to 30 weight percent of the second styrenic block copolymer (the diblock copolymer) based on a total weight of the styrenic component. In some embodiments, there is at least 1 weight percent or at least 5 weight percent and up to 25 weight percent, up to 20 weight percent, up to 15 weight percent, or up to 10 weight percent of the second styrenic block copolymer. If too much of the diblock is added, the shear strength of the pressure-sensitive adhesive may be undesirably low.

In some example pressure-sensitive adhesive compositions, the styrenic component contains 70 to 100 weight percent of the first styrenic block copolymer having at least one rubbery block and two or more glassy blocks and 0 to 30 weight percent of the second styrenic block copolymer that is a diblock copolymer. Stated differently, the styrenic component contains 70 to 100 weight percent of a radial block copolymer and/or linear block copolymer (e.g., linear triblock copolymer) and 0 to 30 weight percent diblock copolymer, 70 to 99 weight percent of a radial block copolymer and/or linear block copolymer and 1 to 30 weight percent diblock copolymer, 70 to 90 weight percent of a radial block copolymer and/or linear block copolymer and 10 to 30 weight percent diblock copolymer, 75 to 100 weight percent weight percent radial block copolymer and/or linear block copolymer and 0 to 25 weight percent diblock copolymer, 75 to 99 weight percent weight percent radial block copolymer and/or linear block copolymer and 1 to 25 weight percent diblock copolymer, 75 to 90 weight percent weight percent radial block copolymer and/or linear block copolymer and 10 to 25 weight percent diblock copolymer, 80 to 100 weight percent radial block copolymer and/or linear block copolymer and 0 to 20 weight percent diblock copolymer, 80 to 99 weight percent radial block copolymer and/or linear block copolymer and 1 to 20 weight percent diblock copolymer, or 80 to 90 weight percent radial block copolymer and/or linear block copolymer and 10 to 20 weight percent diblock copolymer. The percent weight values are based on the total weight of the styrenic component.

In many embodiments, the styrenic component contains 70 to 100 weight percent linear triblock copolymer and 0 to 30 weight percent diblock copolymer, 70 to 99 weight percent linear triblock copolymer and 1 to 30 weight percent diblock copolymer, 70 to 95 weight percent linear triblock copolymer and 5 to 30 weight percent diblock copolymer, or 70 to 90 weight percent triblock copolymer and 10 to 30 weight percent diblock copolymer. The percent weight values are based on the total weight of the styrenic component.

Suitable materials for use as the styrenic component alone or in combination are commercially available under the trade designation KRATON (e.g., KRATON D116 P, D1118, D1119, and A1535) from Kraton Performance Polymers (Houston, TX, USA), under the trade designation SOLPRENE (e.g., SOLPRENE S-1205) from Dynasol (Houston, TX, USA), under the trade designation QUINTAC from Zeon Chemicals (Louisville, KY, USA), and under the trade designations VECTOR and TAIPOL from TSRC Corporation (New Orleans, LA, USA).

The pressure-sensitive adhesive contains at least 40 weight percent and up to 60 weight percent of the styrenic component based on the total weight of the pressure-sensitive adhesive. If the amount of the styrenic component is too low, the tackifier level may be too high and the resulting Tg of the composition may be too high (e.g., the composition may not be a pressure-sensitive adhesive), particularly in the absence of a plasticizer. If the amount of the styrenic component is too high, however, the composition may have a modulus that is too high (e.g., the composition may be too stiff and/or too elastic) and the composition may not wet out well when applied to a substrate. The amount of the styrenic component can be at least 45 weight percent or at least 50 weight percent and up to 55 weight percent or up to 50 weight percent. In some embodiments, the amount of the styrenic component is in a range of 40 to 60 weight percent, 40 to 55 weight percent, 40 to 50 weight percent, 45 to 60 weight percent, 45 to 55 weight percent, or 50 to 60 weight percent based on the total weight of the pressure-sensitive adhesive.

(Meth)Acrylic-Based Polymeric Tackifier

The pressure-sensitive adhesive composition contains a first tackifier that is a linear, (meth)acrylic-based polymeric material and is referred to as a "(meth)acrylic-based polymeric tackifier. As used herein, the terms "(meth)acrylic-based polymeric material" and (meth)acrylic-based polymeric tackifier" or the like refers to a polymeric material that is formed from a first monomer composition wherein at least 60 weight percent, at least 70 weight percent, at least 80 weight percent, at least 90 weight percent, at least 95 weight percent, at least 98 weight percent, at least 99 weight percent, or 100 weight percent of the monomers have a (meth)acryloyl group of formula —(CO)—CR=CH$_2$ where R is hydrogen or methyl.

The (meth)acrylic-based polymeric tackifier has a glass transition temperature equal to at least 50° C. In some embodiments, the glass transition temperature (Tg) is at least 75° C. or at least 100° C. The glass transition temperature can be measured using a technique such as Differential Scanning Calorimetry or Dynamic Mechanical Analysis.

The (meth)acrylic-based polymeric tackifier is formed from a first monomer composition that includes one or more high Tg monomers. As used herein, the term "high Tg monomer" refers to a monomer that has a Tg greater than 50° C. when homopolymerized (i.e., a homopolymer formed from the high Tg monomer has a glass transition temperature greater than 50° C.). Suitable high $T_g$ monomers include, but are not limited to, methyl methacrylate, ethyl methacrylate, n-propyl methacrylate, isopropyl methacrylate, isobutyl methacrylate, sec-butyl methacrylate, tert-butyl (meth)acrylate, phenyl (meth)acrylate, cyclohexyl (meth)acrylate, isobornyl (meth)acrylate, benzyl (meth)acrylate, 3,3,5 trimethylcyclohexyl (meth)acrylate, and mixtures thereof.

In some specific embodiments, the high Tg monomer is selected from methyl methacrylate or a cyclic alkyl (meth)acrylate such as cyclohexyl (meth)acrylate, isobornyl (meth)acrylate, and 3,3,5-timethylcyclohexyl (meth)acrylate.

The amount of high Tg monomers is often at least 30 weight percent, at least 40 weight percent, at least 50 weight percent, at least 60 weight percent, at least 65 weight percent, at least 70 weight percent, at least 75 weight percent, at least 80 weight percent, at least 85 weight percent, or at least 90 weight percent and can be up to 100 weight percent, up to 99 weight percent, up to 98 weight percent, up to 95 weight percent based on the total weight of monomers in the first monomer composition used to form the (meth)acrylic-based polymeric tackifier.

In addition to the high Tg monomer, the first monomer composition can include an optional polar monomer, an optional low Tg monomer, an optional vinyl monomer that does not include a (meth)acryloyl group, or a mixture thereof. These monomers can be provided in any suitable amount in the first monomer composition provided that the resulting (meth)acrylic-based polymeric material has a Tg greater than 50° C.

Optional polar monomers can be included in the first monomer composition used to form the (meth)acrylic-based polymeric tackifier. The polar monomer has an ethylenically unsaturated group plus a polar group such as an acidic group or a salt thereof, a hydroxyl group, a primary amido group, a secondary amido group, a tertiary amido group, or an amino group. Having a polar monomer often facilitates adherence of the pressure-sensitive adhesive to a variety of substrates.

Exemplary polar monomers with an acidic group include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methyl-propanesulfonic acid, vinyl phosphonic acid, and mixtures thereof. Due to their availability, the acid monomers are often (meth)acrylic acids.

Exemplary polar monomers with a hydroxyl group include, but are not limited to, hydroxyalkyl (meth)acrylates (e.g., 2-hydroxyethyl (meth)acrylate, 2-hydroxypropyl (meth)acrylate, 3-hydroxypropyl (meth)acrylate, and 4-hydroxybutyl (meth)acrylate), hydroxyalkyl (meth)acrylamides (e.g., 2-hydroxyethyl (meth)acrylamide and 3-hydroxypropyl (meth)acrylamide), ethoxylated hydroxyethyl (meth)acrylate (e.g., monomers commercially available from Sartomer (Exton, PA, USA) under the trade designation CD570, CD571, and CD572), and aryloxy substituted hydroxyalkyl (meth)acrylates (e.g., 2-hydroxy-2-phenoxypropyl (meth)acrylate).

Exemplary polar monomers with a primary amido group include (meth)acrylamide. Exemplary polar monomers with secondary amido groups include, but are not limited to, N-alkyl (meth)acrylamides such as N-methyl (meth)acrylamide, N-ethyl (meth)acrylamide, N-isopropyl (meth)acrylamide, N-tert-octyl (meth)acrylamide, or N-octyl (meth) acrylamide.

Exemplary polar monomers with a tertiary amido group include, but are not limited to, N-vinyl caprolactam, N-vinyl-2-pyrrolidone, (meth)acryloyl morpholine, and N,N-dialkyl (meth)acrylamides such as N,N-dimethyl (meth) acrylamide, N,N-diethyl (meth)acrylamide, N,N-dipropyl (meth)acrylamide, and N,N-dibutyl (meth)acrylamide.

Polar monomers with an amino group include various N,N-dialkylaminoalkyl (meth)acrylates and N,N-dialkylaminoalkyl (meth)acrylamides. Examples include, but are not limited to, N,N-dimethyl aminoethyl (meth)acrylate, N,N-dimethylaminoethyl (meth)acrylamide, N,N-dimethylaminopropyl (meth)acrylate, N,N-dimethylaminopropyl (meth)acrylamide, N,N-diethylaminoethyl (meth)acrylate, N,N-diethylaminoethyl (meth)acrylamide, N,N-diethylaminopropyl (meth)acrylate, and N,N-diethylaminopropyl (meth)acrylamide.

The amount of the optional polar monomer is often in a range of 0 to 15 weight percent or higher based on the weight of monomers in the first monomer composition. If present, the amount of polar monomers in the first monomer composition is often at least 0.1 weight percent, 0.5 weight percent, or 1 weight percent based on the total weight of monomers in the first monomer composition. The amount can be up to 15 weight percent, up to 10 weight percent, or up to 5 weight percent. For example, the amount is often in a range of 0 to 10 weight percent, in a range of 0 to 5 weight percent, in a range of 0.5 to 15 weight percent, in a range of 1 to 15 weight percent, or in a range of 1 to 10 weight percent based on a total weight of monomers in the first monomer composition used to form the (meth)acrylic-based polymeric tackifier.

In some embodiments, the first monomer composition used to form the (meth)acrylic-based polymeric tackifier contains 85 to 100 weight percent high Tg monomer and 0 to 15 weight percent polar monomer. For example, the first monomer composition contains 85 to 99.5 weight percent high Tg monomer and 0.5 to 15 weight percent polar monomer, 85 to 99 weight percent high Tg monomer and 1 to 15 weight percent polar monomer, or 90 to 99 weight percent high Tg monomer and 1 to 10 weight percent polar monomer. The weight percent values are based on the total weight of monomers in the first monomer composition. In many embodiments where there is a polar monomer, the polar monomer is an acidic monomer such as (meth)acrylic acid.

Stated differently, in some particular embodiments, the (meth)acrylic-based polymeric tackifier contains 85 to 100 weight percent high Tg monomeric units and 0 to 15 weight percent polar monomeric units. For example, the (meth) acrylic-based polymeric polymer contains 85 to 99.5 weight percent high Tg monomeric units and 0.5 to 15 weight percent polar monomeric units, 85 to 99 weight percent high Tg monomeric units and 1 to 15 weight percent polar monomeric units, or 90 to 99 weight percent high Tg monomeric units and 1 to 10 weight percent polar monomeric units. The weight percent values are based on the total weight of monomeric units in the first monomer composition. As used herein, the term "monomeric unit" refers to the polymerized version of the monomer (i.e., the ethylenically unsaturated group of the monomer has undergone polymerization with other ethylenically unsaturated monomers). In many embodiments where there is a polar monomeric unit, the polar monomeric unit is an acidic monomeric unit such as (meth)acrylic acid monomeric unit.

Providing that the Tg of the (meth)acrylic-based polymeric tackifier is sufficiently high (at least 50° C.), optional low Tg monomer that can be included in the first monomer composition. The term "low Tg monomer" refers to a monomer that has a glass transition temperature no greater than 20° C. when polymerized as a homopolymer. That is, a homopolymer formed from the low Tg monomer has a glass transition temperature no greater than 20° C. The glass transition temperature of the homopolymer is often no greater than 10° C., no greater than 0° C., no greater than –10° C., or no greater than –20° C. Suitable low Tg monomers are often selected from an alkyl (meth)acrylate, a heteroalkyl (meth)acrylate, or an aryl substituted alkyl acrylates or aryloxy substituted alkyl acrylates.

Example low Tg alkyl (meth)acrylate monomers often are non-tertiary alkyl acrylates but can be an alkyl methacrylates having a linear alkyl group with at least 4 carbon atoms. Specific examples of alkyl (meth)acrylates include, but are not limited to, methyl acrylate, ethyl acrylate, n-propyl acrylate, n-butyl acrylate, n-butyl methacrylate, isobutyl acrylate, sec-butyl acrylate, n-pentyl acrylate, 2-methylbutyl acrylate, n-hexyl acrylate, cyclohexyl acrylate, 4-methyl-2-pentyl acrylate, 2-methylhexyl acrylate, 2-ethylhexyl acrylate, n-octyl acrylate, 2-octyl acrylate, isooctyl acrylate, isononyl acrylate, isoamyl acrylate, n-decyl acrylate, isodecyl acrylate, n-decyl methacrylate, lauryl acrylate, isotridecyl acrylate, n-octadecyl acrylate, isostearyl acrylate, and n-dodecyl methacrylate.

Example low Tg heteroalkyl (meth)acrylate monomers often have at least 3 carbon atoms, at least 4 carbon atoms, or at least 6 carbon atoms and can have up to 30 or more carbon atoms, up to 20 carbon atoms, up to 18 carbon atoms, up to 16 carbon atoms, up to 12 carbon atoms, or up to 10 carbon atoms. Specific examples of heteroalkyl (meth)acrylates include, but are not limited to, 2-ethoxyethyl acrylate, 2-(2-ethoxyethoxy)ethyl acrylate, 2-methoxyethyl (meth)acrylate, and tetrahydrofurfuryl (meth)acrylate.

Exemplary aryl substituted alkyl acrylates or aryloxy substituted alkyl acrylates include, but are not limited to, 2-biphenylhexyl acrylate, benzyl acrylate, 2-phenoxyethyl acrylate, and 2-phenylethyl acrylate.

The amount of the low Tg monomer used to form the (meth)acrylic-based polymeric tackifier can be up to 50 weight percent or even higher provided that the Tg of the (meth)acrylic-based polymeric tackifier is at least 50° C. In some embodiments, the amount can be up to 40 weight percent, up to 30 weight percent, up to 20 weight percent, up to 15 weight percent, or up to 10 weight percent. The amount can be at least 1 weight percent, at least 2 weight percent, or at least 5 weight percent. For example, the amount can be in a range of 0 to 50 weight percent, 0 to 40 weight percent, 0 to 30 weight percent, 0 to 20 weight percent, 0 to 10 weight percent, 1 to 30 weight percent, 1 to 20 weight percent, or 1 to 10 weight percent. The amount values are based on a total weight of monomers in the first monomer composition used to form the (meth)acrylic-based polymer tackifier.

Optional vinyl monomers that can be included in the first monomer composition do not contain a (meth)acryloyl group. Examples of optional vinyl monomers include, but are not limited to, various vinyl ethers (e.g., vinyl methyl ether), vinyl esters (e.g., vinyl acetate and vinyl propionate), styrene, substituted styrene (e.g., α-methyl styrene), vinyl halide, and mixtures thereof. The vinyl monomers having a group characteristic of polar monomers are considered herein to be polar monomers.

The amount of the optional vinyl monomer lacking a (meth)acryloyl group is often in a range of 0 to 15 weight percent based on the weight of monomers in the first monomer composition. If present, the amount of vinyl monomers in the first monomer composition is often at least 0.1 weight percent, 0.2 weight percent, 0.5 weight percent, or 1 weight percent based on the total weight of monomers in the first monomer composition. The amount can be up to 15 weight percent, up to 10 weight percent, or up to 5 weight percent. For example, the amount is often in a range of 0 to 15 weight percent, in a range of 0.1 to 10 weight percent, in a range of 0.5 to 5 weight percent, or in a range of 1 to 5 weight percent based on a total weight of monomers in the first monomer composition used to form the (meth)acrylic-based polymeric tackifier.

In some embodiment, at least 90 weight percent, at least 95 weight percent, at least 97 weight percent, at least 98 weight percent, at least 99 weight percent, or at least 99 weight percent of the monomers have a (meth)acryloyl group.

The (meth)acrylic-based polymeric tackifiers are typically linear polymers and are not crosslinked. The lack of crosslinking facilitates mixing and compatibility with the styrenic component of the pressure-sensitive adhesive.

Overall the (meth)acrylic-based polymeric tackifier can be formed from a first monomer composition that includes up to 100 weight percent of the high Tg monomer. In some embodiments, the first monomer composition contains 100 weight percent high Tg monomer based on the total weight of monomers in the first monomer composition. In other embodiments, the first monomer composition contains 30 to 100 weight percent of the high Tg monomer, 0 to 15 weight percent polar monomer, 0 to 50 weight percent low Tg monomer, and 0 to 15 weight percent vinyl monomers that do not include a (meth)acryloyl group. In still other embodiments, the first monomer composition contains 60 to 100 weight percent of the high Tg monomer, 0 to 15 weight percent polar monomer, 0 to 20 weight percent low Tg monomer, and 0 to 10 weight percent vinyl monomers that do not include a (meth)acryloyl group. In yet other embodiments, the first monomer composition contains 75 to 100 weight percent of the high Tg monomer, 0 to 10 weight percent polar monomer, 0 to 10 weight percent low Tg monomer, and 0 to 5 weight percent vinyl monomers that do not include a (meth)acryloyl group.

The resulting (meth)acrylic-based polymeric tackifier contains up to 100 weight percent or 100 weight percent high Tg monomeric units. The weight percent value is based on the total weight of monomeric units in the (meth)acrylic-based polymeric tackifier. In some embodiments, the polymer contains 30 to 100 weight percent of the high Tg monomeric units, 0 to 15 weight percent polar monomeric units, 0 to 50 weight percent low Tg monomeric units, and 0 to 15 weight percent vinyl monomeric units. In still other embodiments, the polymer contains 60 to 100 weight percent of the high Tg monomeric units, 0 to 15 weight percent polar monomeric units, 0 to 20 weight percent low Tg monomeric units, and 0 to 10 weight percent vinyl monomeric units. In yet other embodiments, the polymer contains 75 to 100 weight percent of the high Tg monomeric units, 0 to 10 weight percent polar monomeric units, 0 to 10 weight percent low Tg monomeric units, and 0 to 5 weight percent vinyl monomeric units.

Some particular (meth)acrylic-based polymeric tackifiers contain up to 100 weight percent methyl methacrylate monomeric units. Other particular (meth)acrylic-based polymeric tackifiers contain a mixture of isobornyl (meth)acrylate monomeric units and a polar monomeric unit such as (meth)acrylic acid monomeric units or N,N-dimethylacrylamide monomeric units.

In addition to the first monomer composition, the reaction mixture used to prepare the first (meth)acrylic-based polymeric tackifier typically includes a free radical initiator to commence polymerization of the monomers. The free radical initiator can be a photoinitiator or a thermal initiator. Suitable thermal initiators include various azo compound such as those commercially available under the trade designation VAZO from E. I. DuPont de Nemours Co. (Wilmington, DE, USA) including VAZO 67, which is 2,2'-azobis(2-methylbutane nitrile), VAZO 64, which is 2,2'-azobis(isobutyronitrile), VAZO 52, which is 2,2'-azobis(2,4-dimethylpentanenitrile), and VAZO 88, which is 1,1'-azobis(cyclohexanecarbonitrile); various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemical, Inc. (Philadelphia, PA) under the trade designation LUPERSOL (e.g., LUPERSOL 101, which is 2,5-bis(tert-butylperoxy)-2,5-dimethylhexane, and LUPERSOL 130, which is 2,5-dimethyl-2,5-di-(tert-butylperoxy)-3-hexyne); various hydroperoxides such as tert-amyl hydroperoxide and tert-butyl hydroperoxide; and mixtures thereof.

In many embodiments, a photoinitiator is used. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, NJ, USA) or under the trade designation ESACURE KB-1 from Sartomer (Exton, PA, USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl) oxime. Other suitable photoinitiators include, for example, 1-hydroxycyclohexyl phenyl ketone (commercially available under the trade designation IRGACURE 184), bis(2,4, 6-trimethylbenzoyl)phenylphosphineoxide (commercially available under the trade designation IRGACURE 819), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio)phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, NY, USA).

The amount of the free radical initiator is often at least 0.01 weight percent, at least 0.05 weight percent, at least 0.1 weight percent, or at least 0.5 weight percent and can be up to 5 weight percent or higher, up to 3 weight percent, up to 2 weight percent, or up to 1 weight percent based on a total weight of monomers in the first monomer composition. The amount can be, for example, in a range of 0.01 to 5 weight percent, in a range of 0.01 to 2 weight percent, in a range of 0.01 to 1 weight percent, in a range of 0.05 to 1 weight percent, or in an range of 0.1 weight percent based on a total weight of the monomers present in the first monomer composition.

The reaction mixture may optionally further contain a chain transfer agent to control the molecular weight of the resultant (meth)acrylic-based polymeric tackifier. Examples of useful chain transfer agents include, but are not limited to, carbon tetrabromide, alcohols (e.g., isopropanol), mercaptans or thiols (e.g., lauryl mercaptan, butyl mercaptan, ethanethiol, isooctylthioglycolate, 2-ethylhexyl thioglycolate, 2-ethylhexyl mercaptopropionate, ethyleneglycol bis-thioglycolate, and tertiary dodecyl mercaptan), and mixtures thereof. In some embodiments where a chain transfer agent is used that is not an alcohol, the polymerizable mixture often includes up to 2 weight percent, up to 1 weight percent, up to 0.5 weight percent, up to 0.2 weight percent, or up to 0.1 weight percent transfer agent based on a total weight of monomers. If the chain transfer agent is an alcohol, however, the amount of chain transfer agent in the polymerizable mixture can be up to 5 weight percent, up to 10 weight percent, or up to 20 weight percent. If a chain transfer agent is present, the reaction mixture can contain at least 0.005 weight percent, at least 0.01 weight percent, at least 0.02 weight percent, or at least 0.05 weight percent of the chain transfer agent based on the total weight of monomers.

The polymerization of the reaction mixture optionally can occur in the presence of an organic solvent. If an organic solvent is included in the polymerizable mixture, the amount is often selected to provide the desired viscosity. Any desired amount of organic solvent can be used. For example, the amount can be up to 50 weight percent or more, up to 40 weight percent, up to 30 weight percent, up to 20 weight percent, or up to 10 weight percent of the reaction mixture. In some embodiments, the polymerization occurs with little or no organic solvent present. That is the reaction mixture is free of organic solvent or contains a minimum amount of organic solvent such as less than 10 weight percent, less than 5 weight percent, less than 4 weight percent, less than 3 weight percent, less than 2 weight percent, or less than 1 weight percent based on the total weight of the reaction mixture used to form the (meth)acrylic-based tackifier. Examples of suitable organic solvents include, but are not limited to, methanol, tetrahydrofuran, ethanol, isopropanol, heptane, acetone, methyl ethyl ketone, methyl acetate, ethyl acetate, toluene, xylene, and ethylene glycol alkyl ether. Those solvents can be used alone or as mixtures thereof. If used, any organic solvent often is removed at the completion of the polymerization reaction.

The reaction mixture can be polymerized using any suitable method. The polymerization can occur in a single step or in multiple steps. That is, all or a portion of the monomers and/or thermal initiator may be charged into a suitable reaction vessel and polymerized. For example, a reaction mixture containing an organic solvent and a thermal initiator can be mixed and heated at an elevated temperature such as in a range of 50° C. to 100° C. for several hours.

In some embodiments, the (meth)acrylic-based polymeric tackifier is prepared using an adiabatic process as described, for example, in U.S. Pat. No. 5,986,011 (Ellis et al.) and U.S. Pat. No. 5,637,646 (Ellis). In this polymerization method, the reaction components, including thermal initiator or initiators, are sealed in a reaction vessel. The contents are mixed and purged of oxygen and, if not already at induction temperature, then warmed to the induction temperature. The induction temperature, which is usually in the range of 40° C. to 75° C., depends on various factors such as the monomers, the initiator, and amount of the initiator used. The polymerization is performed under essentially adiabatic conditions with a peak reaction temperature in the range of 100° C. to 200° C. Multiple reaction steps with optional cooling in between steps can be employed to increase polymerization conversion on each successive step and to control the molecular weight. Optionally, various reaction components can be added in multiple steps to control the properties (e.g., molecular weight, molecular weight distribution, and polymer composition) of the resulting polymeric material.

In some polymerization methods, it may be desirable to minimize the use of organic solvents that will need to be removed later. One suitable method is to form the (meth) acrylic-based polymeric tackifier within a polymeric pouch that has been purged to remove oxygen. This method, which is further described in U.S. Pat. No. 5,804,610 (Hamer et al.) and U.S. Pat. No. 6,294,249 (Hamer et al.), is particularly advantageous when the (meth)acrylic-based polymeric tackifier is subsequently combined with the other components of the crosslinkable composition using hot melt processing methods.

In this polymerization method, the various components of the reaction mixture can be sealed in a packaging material (e.g., polymeric pouch) that does not dissolve in the presence of the reaction mixture and that is capable of transmitting ultraviolet radiation. The packaging material is usually selected to have a melting point at or below the processing temperature of the (meth)acrylic-based polymeric tackifier, which is the temperature at which this material will flow.

The polymerization reaction mixture occurs upon exposure to UV radiation. Suitable UV sources often have at least 60 percent, at least 65 percent, at least 70 percent, or at least 75 percent of the emission spectra within the range of 280 to 400 nanometers and have an intensity within the range of 0.1 to 25 milliWatts per centimeter squared (mW/cm 2). The temperature of the reaction mixture is often controlled by immersing the sealed polymeric pouch in a water bath or heat transfer fluid controlled at a temperature in a range of 5° C. to 50° C.

In some embodiments, there can be some residual monomers remaining after polymerization. For example, the polymerized product can contain up to 10 weight percent, up to 8 weight percent, up to 6 weight percent, up to 4 weight percent, up to 2 weight percent, or up to 1 weight percent residual monomers based on the total weight of monomers in the reaction mixtures. The residual amount can often be reduced by reacting for a longer period of time. Alternatively, if desired, those of skill in the art know how to remove all or a portion of the residual monomers.

Regardless of the particular polymerization method selected, the resulting product of the polymerization reaction is a random polymer. This polymeric material often has a weight average molecular weight equal to at least 5,000 Da, at least 10,000 Da, at least 20,000 Da, at least 30,000 Da, at least 40,000 Da, or at least 50,000 Da. The weight average molecular weight can be up to 200,000 Da, up to 175,000 Da, up to 150,000 Da, up to 125,000 Da, up to 100,000 Da, up to 75,000 Da, or up to 60,000 Da. For example, the weight average molecular weight is in a range of 5,000 to 200,000 Da, in a range of 5,000 to 150,000 Da, in a range of 5,000 to 100,000 Da, in a range of 5,000 to 75,000 Da, in a range of 5,000 to 60,000 Da, in a range of 10,000 to 60,000 Da, in a range of 10,000 to 75,000 Da, in a range of 10,000 to 100,000 Da, in a range of 20,000 to 100,000 Da, in a range of 20,000 to 75,000 Da, or in a range of 20,000 to 60,000 Da. The weight average molecular weight can be varied, for example, by altering the amount of chain transfer agent included in the reaction mixture.

Some suitable (meth)acrylic-based polymeric tackifiers are commercially available under the trade designation ELVACITE (e.g., ELVACITE 2008C, E2013, E2043, and E4402) from Lucite International incorporated (Cordova, TN, USA).

The amount of the (meth)acrylic-based polymeric tackifier is often in a range of 1 to 15 weight percent based on a total weight of the pressure-sensitive adhesive. If the amount is to low, the composition may not have sufficient holding power on a broad range of substrates (e.g., substrates having a variety of surface energy values), particularly at elevated temperatures. On the other hand, if the amount is too high, the composition may have a glass transition temperature that is too high. That is, the overall composition may be too glassy to function as a pressure-sensitive adhesive. The amount is often in a range of 1 to 15 weight percent. For example, the amount can be at least 2 weight percent, at least 3 weight percent, at least 4 weight percent, or at least 5 weight percent and can be up to 15 weight percent, up to 14 weight percent, up to 13 weight percent, up to 12 weight percent, up to 11 weight percent, or up to 10 weight percent. In some embodiments, the amount is in a range of 2 to 15 weight percent, in a range of 3 to 15 weight percent, in a range of 4 to 15 weight percent, in a range of 5 to 15 weight percent, in a range of 1 to 10 weight percent, in a range of 2 to 10 weight percent, or in a range of 3 to 10 weight percent based on a total weight of the pressure-sensitive adhesive composition.

Second Tackifier

The second tackifier is a not an (meth)acrylic based material. Rather, the second tackifier is compatible with the rubbery block R of the styrenic block copolymer and typically is an aliphatic hydrocarbon tackifier, a terpene tackifier, a terpene phenolic tackifier, or a mixture thereof. Preferably, the tackifier is miscible with (compatible with) the rubbery block but not with the glassy blocks of the first styrenic compound. The addition of the second tackifier facilitates adherence to low surface energy substrates.

As used herein, the term "compatible with" in reference to the second tackifier with the rubbery block R of the first styrenic block copolymer means that the second tackifier is miscible with the rubbery block. Generally, the miscibility of a tackifier with the rubbery block can be determined by measuring the effect of the tackifier on the glass transition temperature of the rubbery block. If a tackifier is miscible, it will alter (e.g., increase) the glass transition temperature of the rubber block. Tackifiers such as hydrocarbon tackifiers, terpene tackifiers, and terpene phenolic tackifiers tend to have relatively low solubility parameters that allow them to associate with the rubbery block; however, the solubility of these tackifiers in the glassy block G can increase as the molecular weight or the softening point of the tackifiers are lowered. The second tackifiers are often selected to have a high softening point such as, for example, at least 100° C., at least 105° C., at least 110° C., at least 115° C., or at least 120° C. The second tackifier is often an aliphatic material to provide the desired compatibility with the rubbery block and to minimize compatibility with the glassy blocks.

Some suitable second tackifiers are aliphatic hydrocarbon resins. In many embodiments, the aliphatic hydrocarbons are fully hydrogenated. Example hydrocarbon tackifiers include, but are not limited to, those commercially available under the trade designation ARKON (e.g., ARKON P140 and ARKON P125) from Arakawa (Eschborn, Germany), under the trade designation REGALREZ (e.g., REGALREZ 1126) from Eastman Chemical Co. (Kingsport, TN, USA), REGALITE (e.g., REGALITE 1125) from Eastman Chemical Co., under the trade designation ESCOREZ (e.g., ESCOREZ 5615, 5320, 1315, 1304, 5637, and 5340) from ExxonMobil Chemical Company (Spring, TX, USA), under the trade designation OPPERA (e.g., OPPERA PR 100A) from Exxon, under the trade designation NEVTAC (e.g., NEVTAC 115) from Neville Chemical Company (Pittsburgh, PA, USA), under the trade designation H-REZ (e.g., H-REZ C9 125H) from NUROZ LLC, Miami, FL, USA), under the trade designation ALPHATAC (e.g., ALPHATACK 115) from R.E. Carroll, Inc. (Ewing, NJ, USA), under the trade designation RESINALL (e.g., RESINALL 1030 and 1030A) from Resinall Corporation (Severn, NC, USA), and under the trade designation FUCLEAR (FUCLEAR FP-125 and FP-100) from United Performance Materials Corporation (Taipei, Taiwan).

Other suitable second tackifiers are terpenes. In many embodiments, the terpenes are polyterpenes (e.g., alpha pinene-based resins, beta pinene-based resins, and limonene-based resins). Example terpenes include, but are not limited to, those available under the trade designation CLEARON (e.g., CLEARON P150 and P135) from Yasuhara Chemical Company, LTD (Hiroshima, Japan).

Still other suitable second tackifiers are terpene phenolic resins (i.e., terpene phenolic tackifiers, or terpene phenolics). Example terpene phenolics include, but are not limited to, those available under the trade designation YS POLYSTER (e.g., POLYSTER T115, T160, T130, S145, and G150) from Yasuhara Chemical Company, LTD (Hiroshima, Japan).

The amount of the second tackifier is often in a range of 10 to 50 weight percent based on a total weight of the pressure-sensitive adhesive. It the amount is too high, the glass transition temperature of the resulting composition may be so high that it would not function as a pressure-sensitive adhesive. If the amount is too low, however, the modulus may be too high and the composition may not wet out well on substrate surfaces. For example, the amount of the second tackifier can be at least 10 weight percent, at least 15 weight percent, at least 20 weight percent, at least 25 weight percent, at least 30 weight percent, or at least 35 weight percent and can be up to 50 weight percent, up to 40 weight percent, up to 35 weight percent, up to 30 weight percent. In some embodiments, the amount is in a range of 10 to 40 weight percent, in a range of 20 to 40 weight percent, in a range of 30 to 40 weight percent, in a range of 30 to 40 weight percent, or in a range of 35 to 40 weight percent. The amounts are based on the total weight of the pressure-sensitive adhesive.

Optional Third Tackifier

In addition to the (meth)acrylic-based polymeric tackifier and the second tackifier that is compatible with the rubbery block of the styrenic component, the pressure-sensitive adhesive can further contain an optional third tackifier that is compatible with the glassy blocks of the styrenic component. Suitable third tackifiers are usually an aromatic hydrocarbon tackifier and are often derived from styrene. If added, the third tackifier is often selected to have a high softening temperature such as, for example, at least 130° C. The addition of the third tackifier can reinforce the physical crosslinking by raising the glass transition temperature of the phase separated domains of the glassy blocks.

Example aromatic hydrocarbon tackifiers include, but are not limited to, those available under the trade designations CUMAR (e.g., CUMAR 130 and 157) and NEVCHEM (e.g., NEVCHEM 240) from Neville Chemical Company (Pittsburgh, PA, USA), under the trade designations FTR2120 and FTR2140 from Mitsui Chemicals America, Inc. (Rye Brook, NY, USA), under the trade designation NORSOLENE (e.g., NORSOLENE S155 and W-140) from Total Cray Valley (Exton, PA, USA), under the trade designations KRISTOLEX (e.g., KRISTALEX 5140 and 3100) and ENDEX (e.g., ENDEX 155) from Eastman Chemical Company (Kingsport, TN, USA), under the trade designation H-REZ (H-REZ AMS-120 and AMS-140) from NUROZ LLC, Miami, FL, USA), under the trade designation YS RESIN (e.g., YS RESIN SX100) from Yasuhara Chemical Co., Ltd. (Hiroshima, Japan), and under the trade designation WESTCO (e.g., WESTCO Ci-120) from Western Reserve Chemical (Stow, OH, USA).

The optional third tackifier can be used in any suitable amount. In some embodiments, the amount can be up to 20 weight percent based on a total weight of the pressure-sensitive adhesive. For example, if present, the amount of the optional third tackifier is often in a range of 1 to 20 weight percent or 1 to 10 weight percent based on a total weight of the pressure-sensitive adhesive. For example, the amount can be at least 1 weight percent, at least 2 weight percent, at least 3 weight percent, at least 5 weight percent and can be up to 20 weight percent, up to 15 weight percent, up to 10 weight percent, up to 8 weight percent, or up to 6 weight percent. The amount of the optional third tackifier is often in a range of 0 to 20 weight percent, in a range of 0 to 10 weight percent, in a range of 0 to 8 weight percent, in a range of 0 to 6 weight percent, in a range of 1 to 10 weight percent, in a range of 1 to 8 weight percent, in a range of 1 to 6 weight percent, in a range of 2 to 10 weight percent, or in a range of 3 to 10 weight percent based on the total weight of the pressure-sensitive adhesive. In some embodiments, the pressure-sensitive adhesive composition is free or substantially free of the third tackifier that is compatible with the glassy blocks of the styrenic block copolymer.

Optional Plasticizers

The pressure-sensitive adhesive can include an optional plasticizer. The plasticizer is often selected to be compatible with one or more blocks of the styrenic block copolymer. As with the tackifiers, compatibility between the plasticizer and one of the blocks is indicated by a change (e.g., a decrease) in the glass transition temperature of the block. In some embodiments, the plasticizer is selected from a naphthenic oil, a liquid (at room temperature) polybutene resin, a liquid (at room temperature) polyisobutylene resin, a liquid (at room temperature) paraffin, a liquid (at room temperature) isoprene polymer, or a phosphate ester.

Example naphthenic oil plasticizers that can be added include, but are not limited to, those commercially available under the trade designation NYFELX (e.g., NYFLEX 222B) from Nynas Naphthenics AB (Stockholm, Sweden) and under the trade designation CALSOL (e.g., CALSOL 5550) from Calumet Specialty Products Partners (Indianapolis, IN, USA). Example liquid paraffin plasticizers that can be added include, but are not limited to, those commercially available under the trade designation FLEXON (e.g., FLEXON 845) from Exxon (Irving, TX, USA), under the trade designation KAYDOL from Paraffinic Sonnebom (Parsippany, NJ, USA), under the trade designation SUNPAR (e.g., SUNPAR 150) from Sunoco (Dallas, TX, USA), and under the trade designation TUFFLO (e.g., TUFFLO 6056) from CITGO (Houston, TX, USA). Example liquid polybutene plasticizers include, but are not limited to, those commercially available under the trade designation OPPANOL (e.g., OPPANOL B 12 SNF) from BASF (Florham Park, NJ, USA) and under the trade designation INDOPOL (e.g., INDOPOL H-8) from Ineos Oligomers Products (League City, TX, USA). Example phosphate esters include, but are not limited to, those commercially available under the trade designation SANTICIZER (e.g., SANTICIZER 141) from Valtris Specialty Chemicals (Independence, OH, USA).

In some embodiments, the pressure-sensitive adhesive composition does not include a plasticizer. That is, the pressure-sensitive adhesive is free of a plasticizer. Because the role of the plasticizer is comparable to that of the diblock styrenic block copolymer, a plasticizer is often not present when a styrenic diblock copolymer is present. Further, plasticizers can migrate to the surface of the pressure-sensitive adhesive. This migration may be undesirable for some applications and may negatively impact the shelf-life stability of various adhesive articles.

In other embodiments, the pressure-sensitive adhesive composition includes a plasticizer. The amount used can depend on the amount of styrenic diblock included in the styrenic component. Often, if a plasticizer is used in the pressure-sensitive adhesive composition, there is no styrenic diblock copolymer or the amount of the styrenic diblock copolymer is relatively low. If the amount of the plasticizer alone or the combined amount of the plasticizer and the styrenic diblock copolymer is too high, the pressure-sensitive adhesive may decrease the holding power of the pressure-sensitive adhesive. If present, the amount of plasticizer is often present in an amount up to 10 weight percent based on a total weight of the pressure-sensitive adhesive. For example, the amount is often at least 1 weight percent, at least 2 weight percent, or at least 5 weight percent and can be up to 10 weight percent, up to 8 weight percent, or up to 7 weight percent.

Optional Elastomeric (Meth)Acrylic-Based Polymeric Material

Another optional component in some pressure-sensitive adhesives is an elastomeric (meth)acrylic-based polymeric material. This material has a glass transition temperature that is typically no greater than 20° C., no greater than 10° C., no greater than 0° C., no greater than −10° C., or no greater than −20° C. This elastomeric material, if present, can be added, for example, to improve the humidity resistance of the pressure-sensitive adhesive and/or to enhance adherence of the pressure-sensitive adhesive when subjected to prolonged heat and humidity exposure.

The elastomeric (meth)acrylic-based polymeric material is prepared in a similar manner to the (meth)acrylic-based polymeric tackifier but the monomer composition selected is different. In the case of the elastomeric (meth)acrylic-based polymeric material, the monomer composition (i.e., the second monomer composition) includes at least 40 weight percent of a low Tg monomer based on a total weight of monomers in the second monomer composition. The low Tg monomer are the same as those described for optional use in the first monomer composition used to form the (meth) acrylic-based polymeric tackifier. In some embodiments, the second monomer composition contains at least 45 weight percent, at least 50 weight percent, at least 60 weight percent, at least 65 weight percent, at least 70 weight percent, or at least 75 weight percent and up to 100 weight percent, up to 99 weight percent, up to 98 weight percent, up to 95 weight percent, or up to 90 weight percent of the low Tg monomer. The amounts are based on the total weight of monomers in the second monomer composition used to form the elastomeric (meth)acrylic-based polymeric material.

Some second monomer compositions can include an optional polar monomer. The polar monomers that can be used are the same as described for use in the first monomer composition for forming the (meth)acrylic-based polymeric tackifier. The amount of polar monomer in the second monomer composition is often in a range of 0 to 15 weight percent based on the weight of monomers in the second monomer composition. If present, the amount of polar monomers in the second monomer composition is often at least 0.1 weight percent, 0.5 weight percent, or 1 weight percent based on the total weight of monomers in the second monomer composition. The amount can be up to 15 weight percent, up to 10 weight percent, or up to 5 weight percent. For example, the amount is often in a range of 0 to 10 weight percent, in a range of 0 to 5 weight percent, in a range of 0.5 to 15 weight percent, in a range of 1 to 15 weight percent, or in a range of 1 to 10 weight percent based on a total weight of monomers in the second monomer composition.

The second monomer composition can optionally include a high Tg monomer. Suitable high Tg monomer are the same as those described for use in the formation of the (meth) acrylic-based polymeric tackifier. The amount of high Tg monomer used to form the elastomeric (meth)acrylic-based polymeric material can be up to 50 weight percent or even higher provided that the Tg of the elastomeric material is no greater than 20° C. In some embodiments, the amount can be up to 40 weight percent, up to 30 weight percent, up to 20 weight percent, up to 15 weight percent, or up to 10 weight percent. The amount can be at least 1 weight percent, at least 2 weight percent, or at least 5 weight percent. For example, the amount can be in a range of 0 to 50 weight percent, 0 to 40 weight percent, 0 to 30 weight percent, 0 to 20 weight percent, 0 to 10 weight percent, 1 to 30 weight percent, 1 to 20 weight percent, 1 to 10 weight percent. The amounts are based on a total weight of monomers in the second monomer composition.

The second monomer composition can include optional vinyl monomers lacking a (meth)acryloyl group. Suitable vinyl monomers are the same as those described for use in the first monomer composition for forming the (meth) acrylic-based polymeric tackifier. The amount of the optional vinyl monomer lacking a (meth)acryloyl group is often in a range of 0 to 15 weight percent based on the weight of monomers in the second monomer composition. If present, the amount of vinyl monomers in the second monomer composition is often at least 0.1 weight percent, 0.2 weight percent, 0.5 weight percent, or 1 weight percent based on the total weight of monomers in the second monomer composition. The amount can be up to 15 weight percent, up to 10 weight percent, or up to 5 weight percent. For example, the amount is often in a range of 0 to 15 weight percent, 0 to 10 weight percent, 0 to 5 weight percent, in a range of 0.1 to 5 weight percent, in a range of 0.5 to 5 weight percent, or in a range of 1 to 5 weight percent based on a total weight of monomers in the second monomer composition.

Overall the elastomeric (meth)acrylic-based polymeric material can be formed from a second monomer composition that includes up to 100 weight percent of the low Tg monomer. In some embodiments, the first monomer composition contains 100 weight percent low Tg monomer based on the total weight of monomers in the second monomer composition. In other embodiments, the second monomer composition contains 40 to 100 weight percent of the low Tg monomer, 0 to 15 weight percent polar monomer, 0 to 50 weight percent high Tg monomer, and 0 to 15 weight percent vinyl monomers that do not include a (meth)acryloyl group. In still other embodiments, the second monomer composition contains 60 to 100 weight percent of the low Tg monomer, 0 to 10 weight percent polar monomer, 0 to 40 weight percent high Tg monomer, and 0 to 10 weight percent vinyl monomers that do not include a (meth)acryloyl group. In yet other embodiments, the second monomer composition contains 75 to 100 weight percent of the low Tg monomer, 0 to 10 weight percent polar monomer, 0 to 20 weight percent high Tg monomer, and 0 to 5 weight percent vinyl monomers that do not include a (meth)acryloyl group.

The resulting elastomeric (meth)acrylic-based polymeric material contains up to 100 weight percent or 100 weight percent low Tg monomer units. The weight percent value is based on the total weight of monomeric units in the elastomeric (meth)acrylic-based polymeric material. In some embodiments, the polymer contains 40 to 100 weight percent of the low Tg monomeric units, 0 to 15 weight percent polar monomeric units, 0 to 50 weight percent high Tg monomeric units, and 0 to 15 weight percent vinyl monomeric units. In still other embodiments, the polymer contains 60 to 100 weight percent of the low Tg monomeric units, 0 to 10 weight percent polar monomeric units, 0 to 40 weight percent high Tg monomeric units, and 0 to 10 weight percent vinyl monomeric units. In yet other embodiments, the polymer contains 75 to 100 weight percent of the low Tg monomeric units, 0 to 10 weight percent polar monomeric units, 0 to 20 weight percent high Tg monomeric units, and 0 to 5 weight percent vinyl monomeric units.

The same methods described for preparing the (meth)acrylic-based polymeric tackifiers are suitable for preparation of the elastomeric polymeric materials. The polymerizable mixtures can include the same types of initiators, chain transfer agents, and the like.

The weight average molecular weight of the elastomeric (meth)acrylic-based polymeric material is often in a range of 500,000 Da to 1,000,000 Da. For example, the weight average molecular weight can be at least 600,000 Da, at least 650,000 Da, at least 700,000 Da and can be up to 1,000,000 Da, up to 950,000 Da, up to 900,000 Da, up to 850,000 Da, or up to 800,000 Da.

The amount of the optional elastomeric (meth)acrylic-based polymeric material is often in a range of 0 to 6 weight percent based on a total weight of the pressure-sensitive adhesive. For example, the pressure-sensitive adhesive can contain at least 0.5 weight percent, at least 1 weight percent, at least 2 weight percent, at least 3 weight percent and up to 6 weight percent, up to 5 weight percent, or up to 4 weight percent elastomeric (meth)acrylic-based polymeric material. In some embodiments, the amount is in a range of 0.5 to 6 weight percent, in a range of 1 to 6 weight percent, in a range of 0.5 to 4 weight percent, or in a range of 1 to 4 weight percent. Often, the pressure-sensitive adhesive is free or substantially free (e.g., less than 0.5 weight percent, less than 0.2 weight percent, less than 0.1 weight percent based on a total weight of the pressure-sensitive adhesive) of the elastomeric (meth)acrylic-based polymeric material.

Further Optional Components

Further optional components can be added to the pressure-sensitive adhesives such as, for example, heat stabilizers, antioxidants, antistatic agents, thickeners, fillers, pigments, dyes, colorants, thixotropic agents, processing aides, nanoparticles, fibers, and mixtures thereof. Such additives, if present, usually contribute in total less than 10 weight percent, less than 5 weight percent, less than 3 weight percent, or less than 1 weight percent to the total weight of the pressure-sensitive adhesive.

Overall Composition of Pressure-Sensitive Adhesive Composition and Method of Making The pressure-sensitive adhesive typically includes at least 40 weight percent of the styrenic component, at least 1 weight percent of the (meth)acrylic-based polymeric tackifier, and at least 10 weight percent of the second tackifier based on a total weight of the pressure-sensitive adhesive. For example, the pressure-sensitive adhesive can include at least 40 weight percent of the styrenic component, at least 1 weight percent of the (meth)acrylic-based polymeric tackifier, and at least 20 weight percent of the second tackifier based on a total weight of the pressure-sensitive adhesive. The pressure-sensitive adhesive can include at least 40 weight percent of the styrenic component, at least 1 weight percent of the (meth)acrylic-based polymeric tackifier, and at least 30 weight percent of the second tackifier based on a total weight of the pressure-sensitive adhesive.

In some embodiments, the pressure-sensitive adhesive compositions contains 40 to 60 weight percent styrenic component, 1 to 25 weight percent (meth)acrylic-based polymeric tackifier, and 10 to 50 weight percent second tackifier. In other embodiments, the pressure-sensitive adhesive contains 40 to 60 weight percent styrenic component, 1 to 15 weight percent (meth)acrylic-based polymeric tackifier, and 20 to 50 weight percent second tackifier. In still other embodiments, the pressure-sensitive adhesive contains 40 to 60 weight percent styrenic component, 1 to 15 weight percent (meth)acrylic-based polymeric tackifier, and 20 to 40 weight percent second tackifier. In yet other embodiment, the pressure-sensitive adhesive contains 40 to 60 weight percent styrenic component, 1 to 15 weight percent (meth)acrylic-based polymeric tackifier, and 30 to 40 weight percent second tackifier. Any of these pressure-sensitive adhesive compositions can further include 0 to 6 weight percent of elastomeric (meth)acrylic-based polymeric material.

A method of making the pressure-sensitive adhesive compositions is provided. The method includes providing each of the following components: (a) a styrenic component that contains a first styrenic block copolymer having at least one rubbery block and at least two glassy blocks, (b) a first tackifier that is a linear (meth)acrylic-based polymeric material having a glass transition temperature equal to at least 50° C. and having a weight average molecular weight in a range of 5,000 to 200,000 Da, and (c) a second tackifier that is compatible with the rubbery block of the styrenic block copolymer, the second tackifier being an aliphatic hydrocarbon tackifier, a terpene resin, a terpene phenolic resin, or a mixture thereof. The method further includes forming a blend of the components.

Any suitable method can be used to form the blend. In some embodiments, the various components are combined without the use of organic solvent or additional organic solvent. Suitable processes include, for example, calendaring or roll milling, and extruding (e.g., single screw, twin screw, disk screw, reciprocating single screw, pin barrel single screw, and the like). Commercially available equipment such as BRABENDER or BANBURY internal mixers are also available to batch mix the components. If the temperature is too high, oxidative degradation of the components being mixed can occur. On the other hand, if the temperature is too law, the components might melt sufficiently for mixing. In some embodiments, the components are hot melt mixed can occur, for example, at a temperature high enough to melt in a range of 150° C. to 200° C., in a range of 160° C. to 200° C., in a range of 150° C. to 180° C., or in a range of 160° C. to 180° C. Hot melt mixing methods can be particularly desirable if the use of organic solvents in the pressure-sensitive adhesive composition is low.

The components of the pressure-sensitive adhesive can be blended neat (i.e., in the absence of an organic solvent) or in the presence of an organic solvent. Any desired amount of organic solvent can be used depending on the particular process being used. If the components are blended using hot melt mixing processes, the mixture is often free of an organic solvent or contains 0 to 10 weight percent or 0 to 5 weight percent organic solvent. For solvent coating methods, the amount of organic solvent in the mixture can be higher such as, for example, up to 60 weight percent, up to 50 weight percent, up to 40 weight percent, or up to 30 weight percent. Thus, the amount of organic solvent in the pressure-sensitive adhesive prior to application to a substrate can be in a range of 0 to 60 weight percent or even higher, in a range of 0 to 50 weight percent, in a range of 0 to 40 weight percent, 0 to 30 weight percent, in a range of 0 to 20 weight percent, or in a range of 0 to 10 weight percent based on a total weight of the pressure-sensitive adhesive. There is an industrial trend towards reducing or minimizing the amount of organic solvents used because they can be expensive to remove and disposal and/or recycling can be problematic.

Articles

Articles are provided that include the pressure-sensitive adhesive composition. In many embodiments, the articles include a first substrate and a pressure-sensitive adhesive layer positioned adjacent to a first major surface of the first substrate. The pressure-sensitive adhesive layer contains the pressure-sensitive adhesive composition described above.

In one embodiment, the article is an adhesive tape and the first substrate is a backing. One surface of the pressure-sensitive adhesive layer is adhered to a first surface of the first substrate.

In other embodiments, the article has two layers of pressure-sensitive adhesive positioned adjacent to opposite major surfaces of the first substrate. That is, the article is a double-sided adhesive tape. At least one of the pressure-sensitive adhesive layers in the double-sided adhesive tape is the pressure-sensitive adhesive described above. In some embodiments, both of the pressure-sensitive adhesive layers are the pressure-sensitive adhesive described above. The backing included in double-sided adhesive tapes can alternatively be referred to as a "core".

The pressure-sensitive adhesive layer can be in direct contact with a major surface of the first substrate. In some applications, this direct contact is desired. That is, there is no intervening layer such as a primer layer. Alternatively, one of more intervening layers may be positioned between the major surface of the first substrate and the pressure-sensitive adhesive layer. For example, in some embodiments, a primer layer may be interposed between the adhesive skin and the major surface. Useful primers are generally known and include, e.g., the primers described in U.S. Pat. No. 5,677,376 (Groves) and U.S. Pat. No. 5,605,964 (Groves).

Any known backing may be used as the first substrate. Exemplary backings include papers and polymeric films (e.g., polyethylene, polyurethane, polyester, and polypropylene), metal foils, and woven and non-woven webs. In some embodiments, a backing that includes a foam may be used. The foam can be an open cell foam or a closed cell foam. The foams can be formed by any known methods such as using a blowing agent or by including expandable microspheres in the composition. The foam can include either a thermoplastic or thermoset polymeric material.

Exemplary foams include acrylic-based foams, polyethylene foams, and polyurethane foams. In some embodiments, the foam is a flexible foam. One particular foam is an acrylic-based foam formed using expandable microspheres. Generally, a flexible foam is a foam which, when in sheet form, can be bent back upon itself without fracturing. Other exemplary foams are described in the *Handbook of Polymer Foams*, David Eaves, editor, published by Shawbury, Shrewsbury, Shropshire, UK: Rapra Technology, 2004.

The pressure-sensitive adhesive layer or the article can be adhered to a substrate such as a substrate having a low surface energy surface without the need for an intervening primer layer. Primers, which are typically adhesion promoters, are often solvent-based compositions. The elimination of primers, particularly those that are formed using solvent-based compositions, is considered advantageous for many applications because of the reduced cost and environmental impact.

The adhesive tape can have the pressure-sensitive adhesive layer positioned adjacent to a single or both major surfaces of a backing layer. That is, the article can be a single sided adhesive tape or a double sided adhesive tape. Referring to FIG. 1, exemplary double sided adhesive tape 10 contains a backing (or core) 30 and two pressure-sensitive adhesive layers (20 and 40). First pressure-sensitive adhesive layer 20 is positioned adjacent to (e.g., bonded to) the first major surface 31 of backing 30, while second pressure-sensitive adhesive layer 40 is positioned adjacent to (e.g., bonded to) the second major surface 32 of backing 30. As shown in FIG. 1, both the first pressure-sensitive adhesive layer 20 and second pressure-sensitive adhesive layer 40 are directly bonded a major surface of backing 30. In some embodiments, one or both pressure-sensitive adhesive layers may be indirectly bonded to backing 30. For example, in some embodiments, one or more additional layers (e.g., primers, adhesion promoting layers, films, webs, scrims, and the like) may be interposed between the backing and an adhesive layer. In some embodiments, the pressure-sensitive adhesive layers 20 and 40 are referred to as adhesive skin layers or as pressure-sensitive adhesive skin layers.

In other embodiments, the first substrate is a release liner. The first pressure-sensitive adhesive layer can be positioned adjacent to the release liner. In some embodiments, the first pressure-sensitive adhesive layer is positioned between a first substrate that is a release liner and a second substrate that is also a release liner. The article includes in the following order a first release liner, a pressure-sensitive adhesive layer, and a second release liner. Alternatively, in other embodiments, the first substrate is a backing layer and the second substrate is a release liner. The article includes in the following order a backing layer, a pressure-sensitive adhesive layer, and a release liner.

The adhesive articles can be used to provide various other articles. For example, an adhesive tape article can be bonded to another substrate. In one embodiment, the adhesive tape article includes a first substrate that is a backing (core) layer with an attached (directly or indirectly) first pressure-sensitive adhesive layer. The adhesive tape article can be attached (directly or indirectly) to a second substrate. The resulting article includes in the following order a first substrate that is a backing (core) layer, a first pressure-sensitive adhesive layer, and a second substrate. In this embodiment, the first pressure-sensitive adhesive layer is positioned between the first substrate and the second substrate.

Various bonded articles can be formed. The bonded articles can include, for example, a double sided adhesive article bonded to two additional surfaces (i.e., bonded to a second substrate and to a third substrate). That is, the dual sided adhesive article includes in the following order a first pressure-sensitive adhesive layer, a first substrate that is a backing (core) layer and a second pressure-sensitive adhesive layer. The bonded articles includes in the following order a second substrate, a first pressure-sensitive adhesive layer, a first substrate that is a backing (core) layer and a second pressure-sensitive adhesive layer, and a third substrate.

Stated differently, a first major surface of the first pressure-sensitive adhesive layer is bonded directly or indirectly to a first major surface of a first substrate that is a backing (core) layer of a double sided adhesive article. A second major surface of the first pressure-sensitive adhesive layer is bonded directly or indirectly to a first major surface of a second substrate. A first major surface of a second pressure-sensitive adhesive layer is bonded directly or indirectly to a second major surface of the first substrate that is the backing (core) layer of the double sided adhesive article. A second major surface of the second pressure-sensitive adhesive layer is bonded directly or indirectly to a second major surface of a third substrate. At least one (and often both) of the first pressure-sensitive adhesive layer and the second pressure-sensitive layer is the pressure-sensitive adhesive composition describe above.

Figure 2:
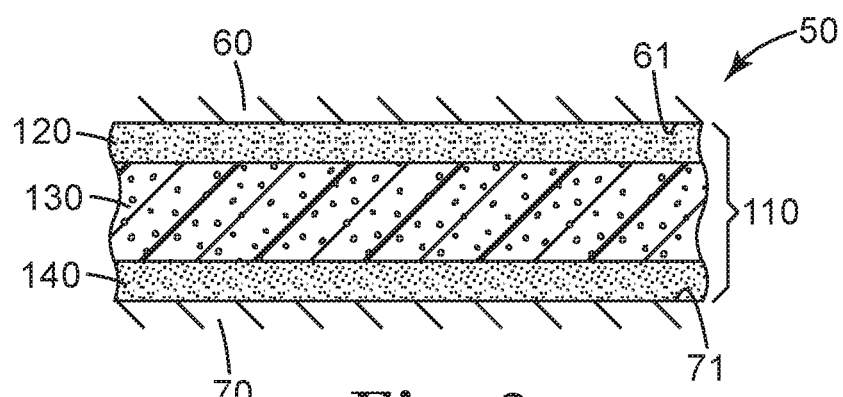
FIG. 2 illustrates a bonded article formed by bonding the double sided adhesive tape of FIG. 1 to two additional surfaces.

Referring to FIG. 2, exemplary bonded article 50 includes a second substrate 60 bonded to third substrate 70 via bonding interface 110. Bonding interface 110 includes a double sided adhesive article having a first substrate that is a backing (or core) layer 130 and two pressure-sensitive adhesive layers 120 and 140. First pressure-sensitive adhesive layer 120 is bonded to a first major surface of backing layer 130, while second pressure-sensitive adhesive layer 140 is bonded to a second major surface of backing layer 130. As shown in FIG. 2, both first pressure-sensitive adhesive layer 120 and second pressure-sensitive adhesive layer 140 are directly bonded a major surface of backing 130. In some embodiments, one or both pressure-sensitive adhesive layer may be indirectly bonded to backing 130.

As shown in FIG. 2, in some embodiments, first pressure-sensitive adhesive layer 120 is bonded directly to major surface 61 of second substrate 60. Similarly, in some embodiments, second pressure-sensitive adhesive layer 140 is directly bonded to major surface 71 of third substrate 70. In some embodiments, one or both pressure-sensitive adhesive layers may be indirectly bonded to a major surface of the second substrate and/or third substrate. For example, in some embodiments, one or more additional layers (e.g., primers, adhesion promoting layers, films, webs, scrims, and the like) may be interposed between a pressure-sensitive adhesive layer and a substrate.

In some embodiments, the second substrate and/or the third substrate include a metal, glass, ceramic, or polymeric materials, and combinations thereof. In some embodiments, the second substrate and/or the third substrate includes a primed, painted, or polymeric surface (e.g., a clear coat). In some embodiments, the second substrate and/or the first substrate may have a low surface energy surface. As used herein, a low surface energy surface means a surface with a measured surface energy below 35 dyne per centimeter. The surface energy of a surface may be tested according to ASTM Standard D2578. Suitable test kits include, e.g., the ACCU-DYNE surface wettability kit, available from Diversified Enterprises, Claremont, New Hampshire.

The pressure-sensitive adhesive layer can often adhere to a low surface energy surface and can adhere at elevated temperatures where many traditional pressure-sensitive adhesives fail. Thus the pressure-sensitive adhesives are suitable for many applications where exposure to elevated temperatures is likely such as in outdoor applications including on vehicles.

The first pressure-sensitive adhesive layer, the second pressure-sensitive adhesive layer, or both in any articles can be either crosslinked or un-crosslinked. Any suitable means of crosslinking can be used. In many embodiments, the crosslinking is provided by exposure to actinic radiation such as electron beam radiation. Crosslinking tends to increase the shear strength of the pressure-sensitive adhesive compositions or layers.

When crosslinking with electron beam radiation, the crosslinking usually occurs after a layer of non-crosslinked pressure-sensitive adhesive has been positioned adjacent to the first substrate. The non-crosslinked pressure-sensitive adhesive is then exposed to a sufficient amount of electron beam radiation to cleave chemical bonds resulting in the formation of free radical sites. Two of these free radical sites can combine resulting in the formation of crosslinks between different portions of the same polymeric chain or between different polymeric chains in the pressure-sensitive adhesive composition.

Any suitable amount of electron beam radiation can be used. The accelerating voltage (in Kiloelectron Volts (KeV)) used is dependent on the thickness of the pressure-sensitive adhesive layer but is often in a range of 100 KeV to 300 KeV or in a range of 150 KeV to 250 KeV. The dosage is often in a range of 2 to 13 MegaRads (MRads), 2 to 10 MRads, 4 to 10 MRads, or 4 to 8 MRads.

Methods of making articles are also provided. The method includes providing a first substrate and positioning a first pressure-sensitive adhesive layer adjacent to a first major surface of the first substrate. Any suitable first substrate can be used and the first pressure-sensitive adhesive layer is the same as described above. The method can optionally include positioning a second pressure-sensitive adhesive layer adjacent to a second surface of the first substrate. The second pressure-sensitive adhesive layer can be the same as or different than the first pressure-sensitive adhesive layer.

In some embodiments, the method includes extruding a first substrate that is a foam. In some embodiments, the method further comprises extruding the pressure-sensitive adhesive layer that is positioned adjacent to the first substrate. In some embodiments, the foam and the pressure-sensitive adhesive layer or layers are co-extruded. Methods of extruding polymeric foams and methods of coextruding polymer foams and adhesives layers are described, e.g., in U.S. Pat. No. 6,103,152 (Gehlsen et al.) and U.S. Pat. No. 6,630,531 (Khandpur et al.).

In some embodiments, the method of making the adhesive article comprises providing the first substrate, which may have been produced by extrusion or any other known means, and applying a first pressure-sensitive adhesive composition to a first surface of the first substrate. The first adhesive composition may be applied by any suitable method such as, for example, by laminating or coating (e.g., knife coating, roll coating, gravure coating, rod coating, curtain coating, spray coating, or air knife coating).

Any of the methods can optionally further include exposing the first pressure-sensitive adhesive layer and/or the second pressure-sensitive adhesive layer to actinic radiation such as ultraviolet or electron beam radiation to crosslink the polymeric material within the pressure-sensitive adhesive layers.

Various embodiments are provided that include pressure-sensitive adhesive compositions, articles containing the pressure-sensitive adhesive compositions, and methods of making the articles.

Embodiment 1A is a pressure-sensitive adhesive composition that includes (a) a styrenic component that contains a first styrenic block copolymer having at least one rubbery block and at least two glassy blocks, (b) a first tackifier that is a linear (meth)acrylic-based polymeric material having a glass transition temperature equal to at least 50° C. and having a weight average molecular weight in a range of 5,000 to 200,000 Daltons, and (c) a second tackifier that is compatible with the rubbery block of the styrenic block copolymer, the second tackifier being an aliphatic hydrocarbon tackifier, a terpene resin, a terpene phenolic resin, or a mixture thereof.

Embodiment 2A is the pressure-sensitive adhesive composition of embodiment 1A, wherein the styrenic component is present in an amount in a range of 40 to 60 weight percent, the first tackifier is present in an amount in a range of 1 to 25 weight percent, and the second tackifier is present in an amount in a range of 10 to 50 weight percent based on a total weight of the pressure-sensitive adhesive.

Embodiment 3A is the pressure-sensitive adhesive composition of embodiment 1A or 2A, wherein the styrenic component is present in an amount in a range of 40 to 60 weight percent, the first tackifier is present in an amount in a range of 1 to 15 weight percent, and the second tackifier is present in an amount in a range of 20 to 50 weight percent based on a total weight of the pressure-sensitive adhesive.

Embodiment 4A is the pressure-sensitive adhesive composition of any one of embodiments 1A to 3A, wherein the styrenic component is present in an amount in a range of 40 to 60 weight percent, the first tackifier is present in an amount in a range of 1 to 15 weight percent, and the second tackifier is present in an amount in a range of 20 to 40 weight percent based on a total weight of the pressure-sensitive adhesive.

Embodiment 5A is the pressure-sensitive adhesive composition of any one of embodiments 1A to 4A, wherein the styrenic component is present in an amount in a range of 40 to 60 weight percent, the first tackifier is present in an amount in a range of 1 to 15 weight percent, and the second tackifier is present in an amount in a range of 30 to 50 weight percent based on a total weight of the pressure-sensitive adhesive.

Embodiment 6A is the pressure-sensitive adhesive composition of any one of embodiment 1A to 5A, wherein the first styrenic block copolymer comprises a linear block copolymer and/or a radial block copolymer.

Embodiment 7A is the pressure-sensitive adhesive composition of any one of embodiments 1A to 6A, wherein the first styrenic block copolymer comprises a linear triblock copolymer.

Embodiment 8A is the pressure-sensitive adhesive composition of any one of embodiments 1A to 7A, wherein the first styrenic block copolymer comprises 5 to 50 weight percent glassy blocks based on a total weight of the first styrenic copolymer.

Embodiment 9A is the pressure-sensitive adhesive composition of any one of embodiments 1A to 8A, wherein the first styrenic copolymer is a linear triblock copolymer comprising 10 to 35 weight percent glassy blocks and 65 to 90 weight percent rubbery block.

Embodiment 10A is the pressure-sensitive adhesive composition of any one of embodiments 1A to 9A, wherein the glassy blocks of the first styrenic block copolymer are polystyrene and wherein the rubbery block of the first styrenic block copolymer is selected from polyisoprene, polybutadiene, polybutadiene, poly(isoprene), poly(isoprene/butadiene), poly(ethylene/butylene), and poly(ethylene/propylene).

Embodiment 11A is the pressure-sensitive adhesive composition of any one of embodiments 1A to 10A, wherein the first styrenic block copolymer has a weight average molecular weight in a range of 100,000 to 1.2 million Daltons.

Embodiment 12A is the pressure-sensitive adhesive composition of any one of embodiments 1A to 11A, wherein the styrenic component further comprises a second styrenic block copolymer that is a styrenic diblock copolymer having a single glassy block and a single rubbery block.

Embodiment 13A is the pressure-sensitive adhesive composition of any one of embodiments 12A, wherein the styrenic diblock copolymer comprises 10 to 50 weight percent glassy block and 50 to 90 weight percent rubbery block.

Embodiment 14A is the pressure-sensitive adhesive composition of embodiments 12A or 13A, wherein the rubbery block of the second styrenic block copolymer has different monomeric units than the rubbery block of the first styrenic block copolymer.

Embodiment 15A is the pressure-sensitive adhesive composition of any one of embodiments 11A to 14A, wherein the second styrenic copolymer has a weight average molecular weight in a range of 75,000 Da to 250,000 Da.

Embodiment 16A is the pressure-sensitive adhesive composition of any one of embodiments 1A to 15A, wherein the styrenic component comprises 70 to 100 weight percent first styrenic block copolymer and 0 to 30 weight percent second styrenic block copolymer based on a total weight of the styrenic component.

Embodiment 17A is the pressure-sensitive adhesive composition of any one of embodiments 1A to 16A, wherein the pressure-sensitive adhesive further comprises a plasticizer.

Embodiment 18A is the pressure-sensitive adhesive composition of any one of embodiments 1A to 17A, wherein the pressure-sensitive adhesive is free or substantially free of a plasticizer.

Embodiment 19A is the pressure-sensitive adhesive composition of any one of embodiments 1A to 18A, wherein the first tackifier has a weight average molecular weight in a range of 10,000 to 200,000 Daltons.

Embodiment 20A is the pressure-sensitive adhesive composition of any one of embodiments 1A to 19A, wherein the first tackifier is formed from a first monomer composition and wherein at least 90 weight percent of monomers in the first monomer composition have a (meth)acryloyl group.

Embodiment 21A is the pressure-sensitive adhesive composition of any one of embodiments 1A to 20A, wherein the first tackifier comprises a polymerized product of a first monomer composition comprising (1) an alkyl (meth)acrylate having a Tg greater than 50° C. when polymerized as a homopolymer, and (2) a polar monomer having an ethylenically unsaturated group and a polar group.

Embodiment 22A is the pressure-sensitive adhesive composition of embodiment 21A, wherein the first monomer composition comprises (1) 90 to 99 weight percent of the alkyl (meth)acrylate having the Tg greater than 50° C. when polymerized as a homopolymer and (2) 1 to 10 weight percent of the polar monomer.

Embodiment 23A is the pressure-sensitive adhesive composition of embodiment 21A or 22A, wherein the alkyl (meth)acrylate having the Tg greater than 50° C. when polymerized as a homopolymer is selected from methyl methacrylate and/or a cyclic alkyl (meth)acrylate and wherein the polar monomer is (meth)acrylic acid.

Embodiment 24A is the pressure-sensitive adhesive composition of any one embodiments 1A to 20A, wherein the first tackifier comprises a polymerized product of a first monomer composition comprising 30 to 100 weight percent of an alkyl (meth)acrylate having a Tg greater than 50° C. when polymerized as a homopolymer, 0 to 15 weight percent of a polar monomer, 0 to 50 weight percent of an alkyl (meth)acrylate having a Tg no greater than 20° C. when polymerized as a homopolymer, and 0 to 5 weight percent of a vinyl monomer that do not contain a (meth)acryloyl group.

Embodiment 25A is the pressure-sensitive adhesive composition of any one of embodiments 1A to 24A, wherein the pressure-sensitive adhesive comprises 1 to 25 weight percent of the first tackifier based on a total weight of the pressure-sensitive adhesive composition.

Embodiment 26A is the pressure-sensitive adhesive composition of any one of embodiments 1A to 25A, wherein the second tackifier is not compatible with the glassy blocks of the first styrenic block copolymer.

Embodiment 27A is the pressure-sensitive adhesive composition of any one of embodiments 1A to 26A, wherein the pressure-sensitive adhesive comprises 10 to 50 weight percent of the second tackifier based on a total weight of the pressure-sensitive adhesive composition.

Embodiment 28A is the pressure-sensitive adhesive composition of any one of embodiments 1A to 27A, wherein the pressure-sensitive adhesive composition further comprises a third tackifier that is compatible with the glassy blocks of the first styrenic block copolymer.

Embodiment 29A is the pressure-sensitive adhesive composition of embodiment 28A, wherein the third tackifier is an aromatic hydrocarbon tackifier.

Embodiment 30A is the pressure-sensitive adhesive composition of any one of embodiments 1A to 29A, wherein the pressure-sensitive adhesive composition is free or substantially free of a third tackifier that is compatible with the glassy blocks of the first styrenic block copolymer.

Embodiment 31A is the pressure-sensitive adhesive composition of any one of embodiments 1A to 30A, wherein the pressure-sensitive adhesive composition further comprises an elastomeric (meth)acrylic-based polymeric material.

Embodiment 32A is the pressure-sensitive adhesive composition of embodiment 31A, wherein the pressure-sensitive adhesive comprise 0 to 6 weight percent of the elastomeric (meth)acrylic-based polymeric material.

Embodiment 33A is the pressure-sensitive adhesive compositions of any one of embodiments 1A to 32A, wherein the pressure-sensitive adhesive composition comprises 40 to 60 weight percent styrenic component, 1 to 25 weight percent (meth)acrylic-based polymeric tackifier, and 10 to 50 weight percent second tackifier.

Embodiment 34A is the pressure-sensitive adhesive composition of any one of embodiments 1A to 33A, wherein the pressure-sensitive adhesive composition is radiation crosslinked using electron beam radiation.

Embodiment 1B is an article that includes a first substrate and a first pressure-sensitive adhesive layer positioned adjacent to a first major surface of the first substrate. The pressure-sensitive adhesive layer comprises a pressure-sensitive adhesive composition that includes (a) a styrenic component that contains a first styrenic block copolymer having at least one rubbery block and at least two glassy blocks, (b) a first tackifier that is a linear (meth)acrylic-based polymeric material having a glass transition temperature equal to at least 50° C. and having a weight average molecular weight in a range of 5,000 to 200,000 Daltons, and (c) a second tackifier that is compatible with the rubbery block of the styrenic block copolymer, the second tackifier being an aliphatic hydrocarbon tackifier, a terpene resin, a terpene phenolic resin, or a mixture thereof.

Embodiment 2B is the article of embodiment 1B, wherein the pressure-sensitive adhesive is any one of embodiments 2A to 34A.

Embodiment 3B is the article of embodiment 1B or 2B, wherein the article further comprises a second pressure-sensitive adhesive layer positioned on a second major surface of the first substrate that is opposite the first major surface.

Embodiment 4B is the article of any one of embodiments 1B to 3B, wherein the first substrate is a foam.

Embodiment 5B is the article of embodiment 4B, wherein the foam comprises an acrylic-based polymer and expanded microspheres.

Embodiment 6B is the article of any one of embodiments 1B to 5B, wherein the article further comprises a second substrate and the first pressure-sensitive adhesive is positioned between the first substrate and the second substrate.

Embodiment 7B is the article of embodiment 6B, wherein the first substrate and/or the second substrate is a release liner.

Embodiment 8B is the article of embodiment 6B, wherein the first substrate and/or the second substrate is a low surface energy substrate having a surface energy below 35 dyne per centimeter.

Embodiment 9B is the article of any one of embodiments 1B to 8B, wherein the article is free of a primer layer between the pressure-sensitive adhesive layer and the first substrate.

Embodiment 10B is the article of embodiment 3B, wherein the first pressure-sensitive adhesive layer is adhered to a second substrate and the second pressure-sensitive adhesive is adhered to a third substrate.

Embodiment 11B is the article of embodiment 10B, wherein the first substrate is a foam.

Embodiment 12B is the article of embodiment 10B or 11B, wherein the second substrate and/or the third substrate has a surface energy below 35 dyne per centimeter.

Embodiment 1C is method of making a pressure-sensitive adhesive compositions. The method includes providing each of the following components: (a) a styrenic component that contains a first styrenic block copolymer having at least one rubbery block and at least two glassy blocks, (b) a first tackifier that is a linear (meth)acrylic-based polymeric material having a glass transition temperature equal to at least 50° C. and having a weight average molecular weight in a range of 5,000 to 200,000 Daltons, and (c) a second tackifier that is compatible with the rubbery block of the styrenic block copolymer, the second tackifier being an aliphatic hydrocarbon tackifier, a terpene resin, a terpene phenolic resin, or a mixture thereof. The method further includes forming a blend of the components.

Embodiment 2C is the method of embodiment 1C, wherein the pressure-sensitive adhesive is any one of embodiments 2A to 34A.

Embodiment 3C is the method of embodiment 1C, wherein the method further comprises crosslinking the pressure-sensitive adhesive composition with electron beam radiation.

Embodiment 1D is method of making an article. The method includes providing a first substrate and a pressure-sensitive adhesive composition. Providing the pressure-sensitive adhesive composition includes blending the following components: (a) a styrenic component that contains a first styrenic block copolymer having at least one rubbery block and at least two glassy blocks, (b) a first tackifier that is a linear (meth)acrylic-based polymeric material having a glass transition temperature equal to at least 50° C. and having a weight average molecular weight in a range of 5,000 to 200,000 Daltons, and (c) a second tackifier that is compatible with the rubbery block of the styrenic block copolymer, the second tackifier being an aliphatic hydrocarbon tackifier, a terpene resin, a terpene phenolic resin, or a mixture thereof. The method further includes positioning a layer of the pressure-adhesive composition adjacent to a first major surface of the first substrate.

Embodiment 2D is the method of embodiment 1D, wherein the pressure-sensitive adhesive is any one of embodiments 2A to 34A.

Embodiment 3D is the method of embodiment 1D, wherein the method further comprises crosslinking the pressure-sensitive adhesive composition with electron beam radiation.

Embodiment 4D is the method of any one of embodiments 1D to 3D, wherein the article is of embodiment 2B to 11B.

EXAMPLES

Materials

| | |
|---|---|
| IOA | Isooctyl acrylate, obtained from 3M Company, St. Paul, MN |
| AA | Acrylic acid, available from BASF Corporation, Florham Park, NJ. |
| BA | Butyl acrylate, available from BASF Corporation, Florham Park, NJ. |
| IBOA | Isobornyl acrylate, available from Chempoint, a Univar Company, Calumet City, IL. |
| EHA | 2-ethyl hexyl acrylate, available from BASF Corporation, Florham Park, NJ. |
| NNDMA | N,N-Dimethyl acrylamide, available from Jarchem Industries, Incorporated, Newark, NJ. |
| IOTG | Isooctylthioglycolate, available from Showa Denko Corporation Tokyo, Japan. |
| D1161 | A styrene-isoprene-styrene triblock copolymer having an approximate styrene content of 15% and 19% diblock content, available under the trade designation KRATON D1161 P from Kraton Performance Polymers, Houston, TX. |
| D1118 | A styrene-butadiene-styrene triblock copolymer having an approximate styrene content of 33% and 78% diblock content, available under the trade designation KRATON D1118 from Kraton Performance Polymers, Houston, TX. |
| D1119 | A styrene-isoprene-styrene triblock copolymer having an approximate styrene content of 22% and 66% diblock content, available under the trade designation KRATON D1119 from Kraton Performance Polymers, Houston, TX. |
| A1535 | A linear triblock copolymer based on styrene and ethylene/butylene having an approximate styrene content of 57%, available under the trade designation KRATON A1535 from Kraton Performance Polymers, Houston, TX. |
| S1205 | A linear random-block styrene-butadiene copolymer having 25% styrene content, 17.5% present as a polystyrene block; available under the trade name SOLPRENE S-1205 from Dynasol, Houston, TX. |
| P140 | A fully hydrogenated hydrocarbon resin with a softening point of 140° C., available under the trade designation ARKON P140 from Arakawa, Osaka, Japan. |
| K5140LV | A hydrocarbon resin made from a mixture of purified styrenic monomers with softening point of 140° C. and weight average molecular weight ($M_w$) of 4650 Daltons, available under the trade designation KRISTALEX 5140LV from Eastman Chemical Company, Kingsport, TN. |
| P150 | A hydrogenated terpene resin with softening point of 150° C., available under the trade designation CLEARON P150 from Yasuhara Chemical Company, Limited, Hiroshima, Japan. |
| E2013 | A low molecular weight methyl methacrylate/n-butyl methacrylate copolymer, having a Tg of 76° C., and a weight average molecular weight (Mw) of 34,000 Daltons, available under the trade designation ELVACITE 2013 from Lucite International Incorporated, Cordova, TN. |
| E4402 | A methyl methacrylate copolymer bead resin with a Tg of 76° C., a weight average molecular weight (Mw) of 40,000 Daltons, and hydroxyl number of 9 milligrams KOH/gram resin; available under the trade designation ELVACITE 4402 from Lucite International Incorporated, Cordova, TN. |
| EVA Black | A pelletized ethyl vinyl acetate containing carbon black at a concentration of 40 wt %, available under the trade designation REMAFIN BLACK EVA 40%, from Clariant Corporation, Holden MA. |
| Irg651 | 2-dimethoxy-2-phenylacetophenone, a photoinitiator available under the trade designation IRGACURE 651 from available from BASF Corporation, Florham Park, NJ. |
| Irg1010 | Pentaerythritoltetrakis(3-(3,5-ditertbutyl-4-hydroxyphenyl)propionate), an antioxidant available under the trade designation IRGANOX 1010, available from BASF Corporation, Florham Park, NJ. |
| D1173 | 2-Hydroxy-2-methyl-1-phenyl-propan-1-one, a photoinitiator available under the trade designation DAROCUR 1173 from BASF Corporation, Florham Park, NJ. |
| IRGANOX 1076 | Octadecyl-3-(3,5-di-tert.butyl-4-hydroxyphenyl)-propionate, an antioxidant, available under the trade designation IRGANOX 1076 from available from BASF Corporation, Florham Park, NJ. |
| PP | Polypropylene, available from Aeromat Plastics Incorporated, Burnsville, MN. |
| TPO | A high melt flow, mineral-filled thermoplastic elastomeric olefin (TEO) resin, available under the trade designation LYONDELL BASELL HIFAX TRC 779X from Standard Plaque Incorporated, Melvindale, MI. |
| PT 1100 | A black colored, foamed acrylic adhesive tape having an acrylic foam core with a density of 550 kilograms/cubic meter, acrylic adhesive skin layers on both sides of the foam core with a release liner over one of the skin adhesive layers, a total tape thickness (without liner) of 1.1 millimeters; available under the trade designation 3M ACRYLIC PLUS TAPE PT1100 from 3M Company, Maplewood, MN. |
| Primed PET film | A 0.001 inch (25 micrometer) thick polyester film, having a silane- based primer on one side, prepared as described in EP 372756 (Stobel et al.). |
| RELEASE LINER 1 | A 0.003 inch (76 micrometers) thick polyester release liner having a different release coating on each side to provide a differential release, obtained from 3M Company, Maplewood, MN. |
| RELEASE LINER 2 | A 0.002 inch (51 micrometers) thick polyester film release liner having a silicone coating on one side, available under the trade designation CLEARSIL T50 RELEASE LINER, from CPFilms Industrial, a division of CPFilms Incorporated, a subsidiary of Eastman Chemical Company, Martinsville, VA. |

Test Methods

Peel Creep Rate

Laminated articles were evaluated for Peel Creep Rate both before and after exposure to electron beam (ebeam) irradiation. The article was exposed on its Release Liner 1 side to e-beam irradiation using an ELECTROCURTAIN CB-300 e-beam unit (Energy Sciences Incorporated, Wilmington, MA) at various accelerating voltages (in Kiloelectron Volts (KeV) to provide various doses (in MegaRads) as shown in Table 4. The Peel Creep Test was done as follows. First, Release Liner 1 was removed from an adhesive transfer tape test specimen measuring 2.5 centimeters by 2.5 centimeters and the exposed adhesive surface was laminated to the primed side of a piece of Primed PET. Next, Release Liner 2 was removed and the second exposed adhesive surface of the transfer tape test specimen was laminated to a polypropylene (PP) substrate using two passes of a 2.0 kilogram (4.5 pound) rubber roller in each direction. The PP substrate was wiped clean using a lint free tissue and isopropanol prior to adhering it to the transfer tape specimen. Test specimens were conditioned for twelve hours at 23° C. and 50% relative humidity, then placed upright in a stand in an oven set at 70° C. with the length of the tape specimen running from top to bottom. The top portion of the tape specimen was pulled back at an angle of 180° and a weight of 100 grams was attached to the end of the tape specimen. Both time and the distance the tape peeled off the substrate (creep distance) were recorded. This information was used to calculate an average peel creep rate in units of millimeters/day. Values of 12 or less before ebeam irradiation and of 2.5 or less after ebeam irradiation are desirable.

90° Angle Peel Adhesion Strength

After removing Release Liner 1 the exposed adhesive surface of an adhesive transfer tape was laminated to the non-liner side of PT1100 foam tape using two passes of a 6.8 kilogram steel roller in each direction. The resulting foam/ adhesive transfer tape article was then exposed to ebeam irradiation from its Release Liner 2 side using an ELECTROCURTAIN CB-300 e-beam unit (Energy Sciences Incorporated, Wilmington, MA) at an accelerating voltage of 240 Kiloelectron Volts (KeV) to provide a dose of 9 MegaRads. Test specimens, measuring 1.27 centimeters by 12.7 centimeters, were then cut and the release liner was removed from PT1100. Next, aluminum foil was laminated to the exposed PT1100 adhesive surface using two passes of a 6.8 kilogram steel roller in each direction. Release Liner 2 was then removed from the adhesive transfer tape/foam construction to expose the PSA of the transfer tape. The exposed PSA surface was placed on a test panel of TPO, and rolled down using two passes of a 6.8 kilogram steel roller in each direction. The bonded samples were allowed to dwell for 24 hours at 25° C. and 50% humidity. The peel test was carried out using a tensile tester equipped with a 50 kiloNewton load cell at room temperature with a separation rate of 30.5 centimeters/minute. The average peel force was recorded and used to calculate the average peel adhesion strength in Newtons/centimeter. Peel adhesion strength values of 40 Newtons/centimeter or more are desirable.

Static Shear Strength

After removing Release Liner 1 the exposed adhesive surface of an adhesive transfer tape was laminated to the non-liner side of PT100 foam tape using 2 passes of a 6.8 kg steel roller in each direction. The resulting foam/adhesive transfer tape article was then exposed to ebeam irradiation from its Release Liner 2 side using an ELECTROCURTAIN CB-300 e-beam unit (Energy Sciences Incorporated, Wilmington, MA) at an accelerating voltage of 240 Kiloelectron Volts (KeV) to provide a dose of 9 MegaRads. Test specimens measuring 1.27 cm×2.54 cm pieces, were then cut and PT1100 product liner was removed. Next, aluminum foil was laminated to the exposed PT1100 adhesive surface using 2 passes of a 6.8 kg steel roller in each direction. Release Liner 2 on the adhesive transfer tape was then removed from the adhesive transfer tape/foam construction. The exposed PSA surface was laminated to a test panel of TPO, and rolled down using 2 passes of a 6.8 kg steel roller in each direction. The bonded samples were subjected to a dwell time of 24 hours at 25° C. and 50% humidity. The test panel was mounted vertically onto a hook in a 70° C. oven, and a 500 gram weight was attached to the aluminum coupon. The hanging time at which the sample fell from the plastic substrate was recorded. The test was stopped after 10000 minutes if failure had not occurred by then. Static shear strength time of 7500 minutes or more are desirable.

Gel Permeation Chromatography

The molecular weight distribution of the HTG and LTG compounds was characterized using conventional gel permeation chromatography (GPC). The GPC instrumentation, which was obtained from Waters Corporation (Milford, MA), included a high pressure liquid chromatography pump (Model 1515HPLC), an auto-sampler (Model 717), a UV detector (Model 2487), and a refractive index detector (Model 2410). The chromatograph was equipped with two 5 micrometer PLgel MIXED-D columns, available from Varian Incorporated, Palo Alto, CA.

Polymeric solutions were prepared by dissolving polymer or dried polymer samples in tetrahydrofuran at a concentration of 0.5 percent (weight/volume) and filtering through a 0.2 micrometer polytetrafluoroethylene filter, available from VWR International, West Chester, PA. The resulting solutions were injected and then eluted at a rate of 1 milliliter/minute through the columns maintained at 35° C. The system was calibrated using polystyrene standards and a linear least squares fit analysis to establish a calibration curve. The weight average molecular weight (Mw) was calculated for each sample against this standard calibration curve.

Glass Transition Temperature (Tg)

The glass transition temperatures (Tg) of the HTG and LTG Acrylic Copolymers were calculated using the Fox Equation: $1/Tg=\Sigma Wi/Tgi$. In this equation, Tg is the glass transition temperature of the mixture, Wi is the weight fraction of component i in the mixture, and Tgi is the glass transition temperature of component i, and all glass transition temperatures are in degrees Kelvin (K). The values used for each Tgi were taken from a list prepared by Aldrich, available at the website https://www3.nd.edu/~hgao/thermal_transitions_of_homopolymers.pdf The values are listed below for convenience.

| Homopolymer | Tgi (° K) |
|---|---|
| Acrylic Acid | 378 |
| Butyl Acrylate | 219 |
| 2-Ethyl Hexyl Acrylate (2EHA) | 223 |
| Isobornyl Acrylate (IBOA) | 367 |
| Isooctyl Acrylate (IOA) | 223 |
| N,N-Dimethyl Acrylamide (NNDMA) | 362 |

Preparation of Polymodal Asymmetric Block Copolymer (PASBC)

A polymodal, asymmetric star block copolymer ("PASBC") was prepared according to U.S. Pat. No. 5,393,787 (Nestegard et al.). The polymer had number average molecular weights of about 4,000 Daltons and about 21,500 Daltons for the two endblocks, 127,000-147,000 Daltons for the arm, and about 1,100,000 Daltons for the star measured by SEC (size exclusion chromatography) calibrated using polystyrene standards. The polystyrene content was between 9.5 and 11.5 percent by weight. The mole percentage of high molecular weight arms was estimated to be about 30%.

Preparation of Acrylic Copolymers (HTG1-HTG3, LTG1-LTG4)

Two sheets of a heat-ethylene/vinyl acetate film having a vinyl acetate content of 6% and a thickness of 0.0635 millimeters (0.0025 inches) (VA24, from Consolidated Thermoplastics Co. of Schaumburg, IL) were heat sealed on their lateral edges and the bottom using a liquid form, fill, and seal machine to form a rectangular tube measuring 13.6 centimeters (5.35 inches) long and 5.2 centimeters (2.05 inches) wide. The tube was then filled with one of the compositions shown in Table 1 to make Acrylic copolymers HTG1-HTG3 and LTG1-LTG 4. The monomer amounts are reported in parts by weight (pbw) and Irg651, IOTG, and Darocur are reported in parts per 100 part of total monomer (pph).

The filled tube was then heat sealed at the top in the cross direction to form a pouch measuring 18 cm by 5 cm, and containing 26 grams of composition. Pouches were placed in a water bath that was maintained between about 21° C. and 32° C., and exposed first on one side then on the opposite side to ultraviolet radiation at an intensity of about 4.5 milliWatts/square centimeter for 8.3 minutes to cure the composition. The radiation was supplied from lamps having about 90% of the emissions between 300 and 400 nanometers (nm), and a peak emission at 351 nm. Copolymers were produced and evaluated for Tg and weight average molecular weights (Mw). The results are shown in Table 1. The resulting pouch adhesive was used to prepare tape articles of the invention using a hot melt process.

TABLE 1

Compositions of HTG and LTG Acrylic Copolymers

| Polymers | IOA (pbw) | BA (pbw) | EHA (pbw) | IBOA (pbw) | AA (pbw) | NNDMA (pbw) | Irg651 (pph) | IOTG (pph) | Darocur 1173 (pph) | Mw (Daltons) | Tg (° C.) |
|---|---|---|---|---|---|---|---|---|---|---|---|
| HTG-1 | 0 | 0 | 0 | 97 | 3 | 0 | 0 | 0.75 | 0.15 | 35,000 | 94 |
| HTG-2 | 0 | 0 | 0 | 97 | 0 | 3 | 0 | 0.60 | 0.12 | 80,000 | 94 |
| HTG-3 | 0 | 0 | 0 | 97 | 3 | 0 | 0 | 1.5 | 0.15 | 5000 | 94 |
| LTG-1 | 45 | 45 | 0 | 0 | 10 | 0 | 0.15 | 0.06 | 0 | 800,000 | −43 |
| LTG-2 | 0 | 0 | 97 | 0 | 3 | 0 | 0 | 0.75 | 1.0 | 6500 | −47 |
| LTG-3 | 0 | 0 | 97 | 0 | 3 | 0 | 0 | 1.0 | 1.3 | 5100 | −47 |
| LTG-4 | 0 | 0 | 97 | 0 | 3 | 0 | 0 | 0.5 | 1.0 | 8200 | −47 |

Examples

Example 1

The pressure sensitive adhesive (PSA) of Example 1 was prepared using the composition shown in Table 2. All amounts shown are given in parts by weight (pbw). The materials were compounded using a co-rotating twin screw extruder, and subjected to 300 rotations per minute mixing (rpm) for three minutes. The extruder and die temperatures were set to 171° C. The PSA was cast onto Release Liner 2. Release liner 1 was then laminated to the exposed adhesive surface of the transfer tape using a nip roller. The resulting laminated article was then evaluated for Peel Creep Rate, Peel Adhesion Strength, and Shear Strength as described in the test methods above. The results are shown in Tables 4 and 5 below.

Examples 2-11

Example 1 was repeated with the following modifications shown in Table 2. In addition to what is shown in Table 2, Example 5 contained 0.3 pbw EVA Black. The resulting laminated articles were then evaluated for Peel Creep Rate, Peel Adhesion Strength, and Shear Strength as described in the test methods above. The results are shown in Tables 4 and 5 below.

Comparative Examples C1-C8

Example 1 was repeated with the following modifications. The compositions were prepared using the materials shown in Table 3. The resulting laminated articles were then evaluated for Peel Creep Rate, Peel Adhesion Strength, and Shear Strength as described in the test methods above. The results are shown in Tables 4 and 5 below.

TABLE 2

Compositions of Examples 1-11

| Ex. | D1161 (pbw) | D1118 (pbw) | P140 (pbw) | P150 (pbw) | Irg1010 (pbw) | HTG-1 (pbw) | HTG-2 (pbw) | HTG-3 (pbw) | LTG-1 (pbw) | S1205 (pbw) | PASBC (pbw) | E2013 (pbw) | E4402 (pbw) | EVA Black (pbw) |
|---|---|---|---|---|---|---|---|---|---|---|---|---|---|---|
| 1 | 55.3 | 0 | 35.7 | 0 | 1.0 | 8.0 | 0 | 0 | 0 | 0 | 0 | 0 | 0 | 0 |
| 2 | 47.7 | 6.1 | 35.2 | 0 | 1.0 | 8.0 | 0 | 0 | 2 | 0 | 0 | 0 | 0 | 0 |
| 3 | 49.2 | 0 | 35.7 | 0 | 1.0 | 8.0 | 0 | 0 | 0 | 6.1 | 0 | 0 | 0 | 0 |
| 4 | 49.2 | 0 | 35.7 | 0 | 1.0 | 8.0 | 0 | 0 | 0 | 0 | 6.1 | 0 | 0 | 0 |
| 5 | 43.5 | 9.0 | 40.0 | 0 | 1.2 | 4.0 | 0 | 0 | 2.0 | 0 | 0 | 0 | 0 | 0.3 |
| 6 | 49.2 | 6.1 | 35.7 | 0 | 1.0 | 8.0 | 0 | 0 | 0 | 0 | 0 | 0 | 0 | 0 |
| 7 | 49.2 | 6.1 | 35.7 | 0 | 1.0 | 0 | 8.0 | 0 | 0 | 0 | 0 | 0 | 0 | 0 |
| 8 | 49.2 | 6.1 | 35.7 | 0 | 1.0 | 0 | 0 | 8.0 | 0 | 0 | 0 | 0 | 0 | 0 |
| 9 | 48.7 | 6.2 | 35.9 | 0 | 1.0 | 0 | 0 | 0 | 0 | 0 | 0 | 8.2 | 0 | 0 |
| 10 | 48.7 | 6.2 | 35.9 | 0 | 1.0 | 0 | 0 | 0 | 0 | 0 | 0 | 0 | 8.2 | 0 |
| 11 | 48.7 | 6.2 | 0 | 36.1 | 1.0 | 8.0 | 0 | 0 | 0 | 0 | 0 | 0 | 0 | 0 |

TABLE 3

Compositions of Comparative Examples

| Ex. | D1161 | D1118 | D1119 | A1535 | P140 | K5140LV | Irg1010 | LTG-1 | LTG-2 | LTG-3 | LTG-4 |
|---|---|---|---|---|---|---|---|---|---|---|---|
| C1 | 54.9 | 0 | 0 | 0 | 44.1 | 0 | 1.0 | 0 | 0 | 0 | 0 |
| C2 | 47.7 | 6.1 | 0 | 0 | 43.2 | 0 | 1.0 | 2.0 | 0 | 0 | 0 |
| C3 | 47.7 | 0.0 | 6.1 | 0 | 43.2 | 0 | 1.0 | 2.0 | 0 | 0 | 0 |
| C4 | 47.7 | 6.1 | 0 | 0 | 35.2 | 8.0 | 1.0 | 2.0 | 0 | 0 | 0 |
| C5 | 47.7 | 6.1 | 0 | 8.0 | 35.2 | 0 | 1.0 | 2.0 | 0 | 0 | 0 |
| C6 | 48.7 | 6.2 | 0 | 0 | 36.1 | 0 | 1.0 | 0 | 8.0 | 0 | 0 |
| C7 | 48.7 | 6.2 | 0 | 0 | 36.1 | 0 | 1.0 | 0 | 0 | 8.0 | 0 |
| C8 | 48.7 | 6.2 | 0 | 0 | 36.1 | 0 | 1.0 | 0 | 0 | 0 | 8.0 |

Results

Examples of the invention exhibit improved performance over the comparative examples.

TABLE 4

Peel Creep Rate Results

| | Before EBeam | After EBeam | |
|---|---|---|---|
| Ex. | Peel Creep Rate on PP (mm/day) | EBeam/Dose (KeV/MRads) | Peel Creep Rate on PP (mm/day) |
| C1 | 2061 | 220/6 | 12 |
| C2 | 15 | 220/6 | 3.1 |
| C3 | 379 | 220/6 | 29 |
| C4 | 195 | 220/6 | 3.9 |
| C5 | 1060 | 220/6 | 20 |
| C6 | 9144 | 240/4 | 2202 |
| C7 | 773 | 240/4 | 1473 |
| C8 | 2286 | 240/4 | 2903 |
| E1 | 4.8 | 240/4 | 0.4 |
| E2 | 1.4 | 220/6 | 0.3 |
| E3 | 2.9 | 240/4 | 0.2 |
| E4 | 2.9 | 240/4 | 0.75 |
| E5 | 4.5 | 240/4 | 0.6 |
| E6 | 3.5 | 240/4 | 0.6 |
| E7 | 0.8 | 240/4 | 0.5 |
| E8 | 6.1 | 240/4 | 1.85 |
| E9 | 3.6 | 220/6 | 1.65 |
| E10 | 5.3 | 220/6 | 2.4 |
| E11 | 12 | 240/4 | 0.55 |

TABLE 5

Static Shear Strength and Peel Adhesion Strength Results

| Ex. | Static Shear Strength (TPO) (mins) | Peel Adhesion Strength (TPO) (N/cm) |
|---|---|---|
| C1 | 8 | 48 |
| C2 | 7165 | 48 |
| C3 | 1025 | 49 |
| C4 | 3421 | 51 |
| C5 | 112 | 49 |
| C6 | 2 | 14 |
| C7 | 12 | 36 |
| C8 | 19 | 36 |
| E1 | 10000 | 46 |
| E2 | 10000 | 43 |
| E3 | 10000 | 49 |
| E4 | 10000 | 47 |
| E5 | 10000 | 47 |
| E6 | 8136 | 47 |
| E7 | 10000 | 52 |
| E8 | 10000 | 47 |
| E9 | 9347 | 47 |
| E10 | 10000 | 47 |
| E11 | 7520 | 47 |

What is claimed is:

1. A pressure-sensitive adhesive composition comprising:
   a) a styrenic component comprising a first styrenic block copolymer having at least one rubbery block and at least two glassy blocks;
   b) a first tackifier that is a linear (meth)acrylic-based polymeric material having a glass transition temperature equal to at least 50° C. and having a weight average molecular weight in a range of 5,000 to 200,000 Daltons; and
   c) a second tackifier that is compatible with the at least one rubbery block of the first styrenic block copolymer, the second tackifier being an aliphatic hydrocarbon tackifier, a terpene resin, a terpene phenolic resin, or a mixture thereof.

2. The pressure-sensitive adhesive of claim 1, wherein the first styrenic block copolymer comprises 5 to 50 weight percent glassy blocks based on a total weight of the first styrenic copolymer.

3. The pressure-sensitive adhesive of claim 1, wherein the first styrenic block copolymer is a linear triblock copolymer comprising 10 to 35 weight percent glassy blocks and 65 to 90 weight percent rubbery block.

4. The pressure-sensitive adhesive composition of claim 1, wherein the styrenic component further comprises a second styrenic copolymer that is a styrenic diblock copolymer having a single glassy block and a single rubbery block.

5. The pressure-sensitive adhesive composition of claim 4, wherein the styrenic diblock copolymer comprises 10 to 50 weight percent glassy block and 50 to 90 weight percent rubbery block.

6. The pressure-sensitive adhesive composition of claim 4, wherein the styrenic component comprises 70 to 100 weight percent of the first styrenic block copolymer and up to 30 weight percent of the second styrenic copolymer based on a total weight of the styrenic component.

7. The pressure-sensitive adhesive composition of claim 1, wherein the linear (meth)acrylic-based polymeric material is a polymerized product of a first monomer composition comprising 30 to 100 weight percent of an alkyl (meth) acrylate having a $T_g$ greater than 50° C. when polymerized as a homopolymer, 0 to 15 weight percent of a polar monomer, 0 to 50 weight percent of an alkyl (meth)acrylate having a $T_g$ no greater than 20° C. when polymerized as a homopolymer, and 0 to 5 weight percent of a vinyl monomer that does not contain a (meth)acryloyl group.

8. The pressure-sensitive adhesive composition of claim 1, wherein the pressure-sensitive adhesive comprises 1 to 25 weight percent of the first tackifier based on a total weight of the pressure-sensitive adhesive composition.

9. The pressure-sensitive adhesive composition of claim 1, wherein the pressure-sensitive adhesive comprises 10 to 50 weight percent of the second tackifier based on a total weight of the pressure-sensitive adhesive composition.

10. The pressure-sensitive adhesive compositions of claim 1, wherein the pressure-sensitive adhesive composition comprises 40 to 60 weight percent of the styrenic component, 1 to 25 weight percent the (meth)acrylic-based polymeric material tackifier, and 10 to 50 weight percent of the second tackifier.

11. The pressure-sensitive adhesive composition of claim 1, wherein the pressure-sensitive adhesive composition further comprises an elastomeric (meth)acrylic-based polymeric material.

12. The pressure-sensitive adhesive composition of claim 1, wherein the pressure-sensitive adhesive composition is radiation crosslinked using electron beam radiation.

13. An article comprising:
   a first substrate; and
   a first pressure-sensitive adhesive layer positioned adjacent to the first substrate, wherein the first pressure-sensitive adhesive layer comprises a pressure-sensitive adhesive composition comprising
   a) a styrenic component comprising a first styrenic block copolymer having at least one rubbery block and at least two glassy blocks;
   b) a first tackifier that is a linear (meth)acrylic-based polymeric material having a glass transition temperature equal to at least 50° C. and having a weight average molecular weight in a range of 5,000 to 200,000 Daltons; and c) a second tackifier that is compatible with the rubbery block of the styrenic block copolymer, the second tackifier being an aliphatic hydrocarbon tackifier, a terpene resin, a terpene phenolic resin, or a mixture thereof.

14. The article of claim 13, wherein the first substrate is a foam.

15. The article of claim 13, wherein the article is free of a primer layer between the first substrate and the first pressure-sensitive adhesive layer.

* * * * *